United States Patent
Vu et al.

(10) Patent No.: US 12,177,275 B2
(45) Date of Patent: Dec. 24, 2024

(54) SYSTEMS AND METHODS FOR VIDEO CONFERENCING AND COLLABORATION

(71) Applicant: ScreenBeam Inc., San Jose, CA (US)

(72) Inventors: Chuong Vu, Cupertino, CA (US); Dean Chang, Sunnyvale, CA (US); Chuang Li, Saratoga, CA (US)

(73) Assignee: ScreenBeam Inc., San Jose, CA (US)

( * ) Notice: Subject to any disclaimer, the term of this patent is extended or adjusted under 35 U.S.C. 154(b) by 283 days.

(21) Appl. No.: 17/649,653

(22) Filed: Feb. 1, 2022

(65) Prior Publication Data

US 2022/0247801 A1    Aug. 4, 2022

Related U.S. Application Data

(60) Provisional application No. 63/262,556, filed on Oct. 14, 2021, provisional application No. 63/184,165, filed on May 4, 2021, provisional application No. 63/144,944, filed on Feb. 2, 2021.

(51) Int. Cl.
*H04L 65/4038*    (2022.01)

(52) U.S. Cl.
CPC ................... *H04L 65/4038* (2013.01)

(58) Field of Classification Search
CPC ............. H04L 65/4038; H04L 65/1069; H04L 65/4015; H04L 65/1093
USPC ...................................... 348/14.08
See application file for complete search history.

(56) References Cited

U.S. PATENT DOCUMENTS

| | | | |
|---|---|---|---|
| 6,343,313 B1 | 1/2002 | Salesky et al. | |
| 10,560,499 B2 | 2/2020 | Vu et al. | |
| 2004/0221323 A1* | 11/2004 | Watt ................. | H04L 65/403 |
| | | | 725/135 |

(Continued)

FOREIGN PATENT DOCUMENTS

| | | |
|---|---|---|
| EP | 1526445 A2 | 4/2005 |
| WO | WO-2012088419 A1 | 6/2012 |
| WO | WO-2014185690 A1 | 11/2014 |

OTHER PUBLICATIONS

Apple TV User Guide, 36 pages (2012).

(Continued)

*Primary Examiner* — Yosef K Laekemariam
(74) *Attorney, Agent, or Firm* — Greenberg Traurig, LLP; Robert D. Ward

(57) ABSTRACT

A conference and collaboration system including local computing devices and a receiver are provided. The receiver and/or local devices may run collaboration applications and/or virtual conferencing applications. The receiver and/or at least one local device may be in communication with a remote server running a conference platform and hosting a virtual conference. The receiver may join the conference as a participant and share audio/visual data with the conference platform. The local device may also join and may share audio/visual data with the conference platform and receive conference audio/visual data from the conference platform. The local device may share the conference audio/visual data with the receiver. The receiver may further receive audio/visual data from a non-participant local device and send such data to the conference platform. Alternatively, only a conference device may join the conference as a participant and share audio/visual data from the conference with the local devices.

20 Claims, 13 Drawing Sheets

(56) References Cited

U.S. PATENT DOCUMENTS

| | | |
|---|---|---|
| 2005/0036509 A1 | 2/2005 | Acharya et al. |
| 2005/0273510 A1 | 12/2005 | Schuh |
| 2006/0031779 A1 | 2/2006 | Theurer et al. |
| 2007/0176893 A1 | 8/2007 | Sato |
| 2007/0261102 A1 | 11/2007 | Spataro et al. |
| 2009/0027397 A1 | 1/2009 | Frisken |
| 2010/0333127 A1 | 12/2010 | Scott et al. |
| 2011/0246552 A1 | 10/2011 | Nicholson et al. |
| 2011/0271129 A1 | 11/2011 | Flannagan et al. |
| 2014/0103104 A1 | 4/2014 | Jover |
| 2014/0108506 A1 | 4/2014 | Borzycki et al. |
| 2014/0141725 A1 | 5/2014 | Jesme et al. |
| 2014/0192058 A1 | 7/2014 | Kodama et al. |
| 2014/0330732 A1 | 11/2014 | Grignon |
| 2014/0337769 A1 | 11/2014 | Kim et al. |
| 2015/0089452 A1 | 3/2015 | Dorninger |
| 2015/0188838 A1 | 7/2015 | Bhattacharya et al. |
| 2015/0326654 A1 | 11/2015 | Lee et al. |
| 2016/0295167 A1 | 10/2016 | Sakurai |
| 2017/0195374 A1 | 7/2017 | Vu et al. |
| 2017/0351757 A1 | 12/2017 | Strober |
| 2018/0247550 A1 | 8/2018 | Lu et al. |
| 2018/0375907 A1* | 12/2018 | Ivov .................... H04N 7/15 |
| 2019/0121599 A1 | 4/2019 | Locascio et al. |
| 2019/0155498 A1 | 5/2019 | Angelov et al. |
| 2020/0090536 A1 | 3/2020 | Xiong et al. |
| 2020/0177650 A1 | 6/2020 | Vu et al. |
| 2020/0204606 A1 | 6/2020 | Papalini et al. |
| 2021/0153801 A1 | 5/2021 | Tsoi et al. |

OTHER PUBLICATIONS

Barkay, et al., Evaluating Intel.RTM. Pro Wireless Display for Enterprise Use, Sep. 2013 (pp. 1-7).
Intel® Pro Wireless Display—White Paper, 12 pages (2015).
Intel.RTM. Pro WiDi Quick Start Guide, 1 page (2015).
Intel.RTM. Pro Wireless Display Implementation Guide, Version 2.4, 52 pages (Nov. 2015).
Intel.RTM. Pro Wireless Display Users Guide, Version 2.0, 28 pages (2015).
International Search Report & Written Opinion dated Apr. 5, 2017 in Int'l PCT Patent Appl Serial No. PCT/US2016/068989 (2410), 9 pages.
International Search Report & Written Opinion dated Feb. 26, 2021 in Int'l PCT Patent Appl. Serial No. PCT/US2020/062427 (3110).
NetSupport School, Product Manual—Version 12.00, 2015, (382 pages).
NetSupport School, Tutor for Android Manual, 2015 (63 pages).
Samsung AllShare Cast Dongle User Guide, 2013, (82 pages).

* cited by examiner

SYSTEMS AND METHODS FOR VIDEO CONFERENCING AND COLLABORATION

CROSS-REFERENCE TO RELATED APPLICATION

This application claims priority to U.S. Provisional Application Ser. No. 63/262,556, filed Oct. 14, 2021, U.S. Provisional Application Ser. No. 63/184,165, filed May 4, 2021, and U.S. Provisional Application Ser. No. 63/144,944, filed Feb. 2, 2021, the entire contents of each of which are incorporated herein by reference.

TECHNICAL FIELD

The present disclosure relates, in general, to conferencing and collaboration systems, and more particularly, to efficiently facilitating conferencing and collaboration across multiple devices.

BACKGROUND

For both business and leisure, digital and/or virtual meetings and conferences are increasing in use and popularity. Such virtual conferences may involve two or more computing devices that connected to one another (e.g., over the internet) for communicating visually and/or audibly via a conference platform. For example, two computing devices may connect over the internet via a cloud based conferencing platform. Each device may generate visual (e.g., video) images of each respective user (e.g., via a camera on the computing device) and may also generate audio of each respective user (e.g., via a microphone on the computing device). The visual and audio data may be sent to the conferencing platform (e.g., running on a remote server), which may create an interface incorporating the visual data and/or the audio data from each device. Each computing device may present the interface on each respective computing device. The interface may display the visual data from one or more computing devices as well as the audio data from one or more computing devices. As the exchange of visual and/or audio data may occur in near real time, users of each computing device may communicate with one another via the audio and/or visual data. Virtual conference systems may connect more than two computing device (e.g., three, ten, twenty, etc.) and thus may exchange audio and/or visual data from such devices.

Virtual conference systems typically include a host and other invited participants. The host is the individual that sets up the meeting and sends a digital invite to join the meeting (e.g., via email, text message, social media, etc.). Each participant must connect to the conference platform (e.g., cloud based platform) via a computing device. The computing device may communicate with the conference platform over an Internet a cellular connection, for example. In this manner, each computing device must be responsible for receiving audio and visual data from the conference platform (e.g., conference data). The conference data may be processed by the computing device (e.g., decoded, decompressed, decrypted, and the like) for presentation on the computing device. Additionally, each computing device may be responsible for capturing and/or obtaining audio and/or visual data corresponding to the user using that particular computing device. The captured and/or obtained audio and/or visual data may be processed by the computing device (e.g., encoded, compressed, encrypted, and the like) for transmission to the cloud-based conference platform.

As the virtual conference supports real-time communication between the computing devices, audio and visual data is constantly being obtained, generated, sent, processed, and presented. Processing the high volume of conference data for presentation on the computing device and processing the high volume of captured and/or obtained audio and/or visual data for transmission to the cloud-based platform takes a significant amount a processing power. If the computing device does not have the processing capabilities to support the real-time communication, the transmission and presentation of audio and visual data may be compromised.

A virtual conference may require an invitation from the host such that a user may only join the virtual conference if an invitation has been received by the user. The invitation may include a meeting code or password required to join the conference. Accordingly, each participant must be invited to the meeting. This requirement may be cumbersome as individuals may have been mistakenly left off from an invite list. Further, in some situations, it may be cumbersome or infeasible to determine ahead of time who should be invited to the meeting or conference. Also, a local application may be required on a computing device to join the conference. Accordingly, if a particular computing device does not have that local application, it may not join the conference.

In one example, if there is a conference room full of individuals it may be cumbersome to send an invitation to each person. Further, some individuals in the conference room may not have a computing device. In such circumstances, an invitee participant of the virtual conference located in the conference room may join the conference with a computing device and may even project the display of their computing device to a display in the conference room. However, the microphone and camera input may be built into the computing system of that participant and may be directed at only the participant. In another example, if there are several computing devices in one location, too many Wi-Fi connections may burden the network and compromise Internet connectivity for all computing devices on that network.

In view of the foregoing limitations of previously known systems and methods, it would be desirable to provide systems and methods that facilitate efficient conferencing and collaboration across multiple devices accessible to participant and non-participant users.

SUMMARY OF THE INVENTION

In accordance with one aspect of the present invention, a method is provided for video conferencing on a conference device running a first conference application may include establishing a connection using the first conference application with a conference platform running on a server and in communication with a remote device. The first conference application and the conference platform may facilitate communication between the conference device. The remote server and the remote device may run a second conference application. The method may further include receiving conference data including first visual data from the server via the first conference application. The conference data may be generated by the remote device. The method may include communicating the conference data to a receiver running a first collaboration application, determining local input data including second visual data generated by a first input device in communication with the conference device, sending the local input data to the server via the first conference application for presentation on the remote device, and receiving collaboration data including third visual data from the receiver. The collaboration data generated by a moderator device may be in communication with a receiver and running a second collaboration application. The first and second collaboration applications may facilitate communication between the receiver and the moderator device. The method may further include sending the collaboration data to the server via the first conference application for presentation on the remote device.

The method for video conferencing on a conference device may further include receiving instructions to send a combined representation of the collaboration data and local input data to the server, via the conference application. Receiving collaboration data from the receiver may include receiving collaboration data via a WiFi, Ethernet, or USB connection between the receiver and the conference device. The input device may be a camera incorporated into the conference device. The conference data may include first audio data. The local input data may further include second audio data, and the collaboration data may further include third audio data. Communicating the conference data to a receiver may include communicating conference data to a display in communication with the receiver via an HDMI switch. The HDMI switch may be incorporated into the receiver.

In accordance with another aspect of the present invention, a computerized-system is provided for video conferencing on a conference device running a first conference application. The computerized-system may be designed to establish a connection using the first conference application with a conference platform running on a server and in communication with a remote device. The first conference application and the conference platform may facilitate communication between the conference device. The remote server and the remote device may run a second conference application. The computerized-system may further receive conference data including first visual data from the server via the first conference application. The conference data may be generated by the remote device. The computerized-system may further communicate the conference data to a receiver running a first collaboration application, determine local input data including second visual data generated by a first input device in communication with the conference device, send the local input data to the server via the first conference application for presentation on the remote device, and receive collaboration data including third visual data from the receiver. The collaboration data may be generated by a moderator device in communication with a receiver and may run a second collaboration application. The first and second collaboration applications may facilitate communication between the receiver and the moderator device. The computerized-system may send the collaboration data to the server via the first conference application for presentation on the remote device.

The computerized-system may further receive instructions to send a combined representation of the collaboration data and local input data to the server, via the conference application. It is understood that receiving collaboration data from the receiver may include receiving collaboration data via a WiFi, Ethernet, or USB connection between the receiver and the conference device.

In accordance with another aspect of the present invention, a method is provided for video conferencing on a moderator device running a first collaboration application and a first conference application. The method may include determining, using the first collaboration application, a first connection with a receiver running a second collaboration application, the receiver connected to a first member device running a third collaboration application. The method may further include determining, using the first conference application, a second connection with a server running a conference platform, the server connected to a remote device running a second conference application. The method may further include, determining, using the first collaboration application, first visual data from the receiver, the first visual data indicative of first display data presented on a first display of the first member device. The method may further include sending, using the first conference application, the first visual data to the server to be displayed on a second display of the remote device using the second conference application. The method may further include receiving, using the first conference application, second visual data from the server, the second visual data received by the server from the remote device.

The moderator device and the first member device may be situated in a first location, the server may be situated in a second location, and the remote device is situated in a third location, and each of the first location, the second location, and the third location may be different. The method may further include determining a third connection with a display device, and sending the display device the second visual data to cause the display device to present the second visual data. The method may further include determining third visual data, the third visual data indicative of third display data presented on a third display of the moderator device, and sending, using the first conference application, the third visual data to the server to be simultaneously displayed with the first visual data on the second display of the remote device using the second conference application.

The method may further include determining a fourth connection with a first input device, and determining fourth visual data from a first input device. The method may further include sending, using the first conference application, the fourth visual data to the server to be displayed on the second display of the remote device using the second conference application. The method may further include displaying third visual data on the a third display of the moderator device while simultaneously sending the fourth visual data to the server. The method may further include determining first audio data from a first input device, and sending, using the first conference application, the first audio data to the server to be simultaneously presented with the first visual data on the second display of the remote device using the second conference application. The method may further include encrypting the first visual data prior to sending the first visual data to the server. The receiver may be further connected to a second member device running a fourth collaboration application. The method may further include determining, using the first collaboration application, fifth visual data from the receiver, the fifth visual data indicative of fourth display data presented on a fourth display of the second member device. The method may further include sending, using the first conference application, the fifth visual data to the server to be displayed on the second display of the remote device using the second conference application.

The foregoing summary is illustrative only and is not intended to be in any way limiting. In addition to the illustrative aspects, embodiments, and features described above, further aspects, embodiments, and features will become apparent by reference to the following drawings and the detailed description.

Figure 1:
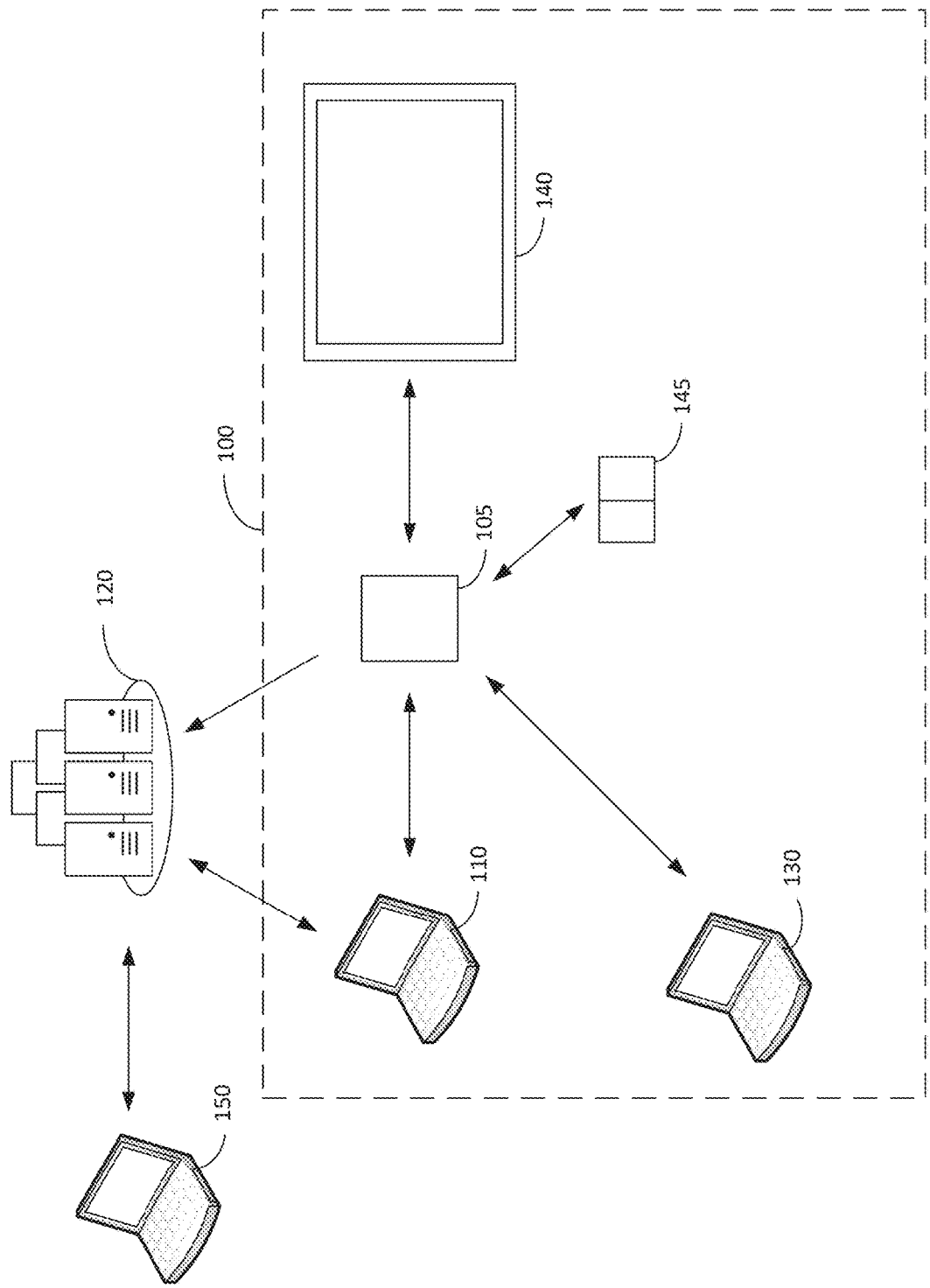
FIG. 1 is a schematic illustration of the conference and collaboration system in communication with a remote server and remote computing device, in accordance with the principles of the present invention.

The foregoing and other features of the present invention will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION OF THE INVENTION

The present invention is directed to a conference and collaboration system involving a receiver and one or more member and/or moderator computing devices (e.g., local devices) that may be in communication with the receiver, a remote server and/or one or more remote computing devices. The remote server may run a conference platform and the receiver, one or more local devices, and remote devices may also run a conference application. The local devices, receiver, and/or remote devices may communicate with one another by connecting to the conference platform (e.g., over the Internet). Further, the receiver and/or one or more of the local devices may run a collaboration application to share their screens or other data (e.g., images, files, videos, audio, etc.) with other computing devices on the collaboration platform. The local devices may further include a conference device which may run a conference application and communicate with the remote server.

The conference application optionally running on the receiver may be different from the conference application running on one or more of the local computing devices in that the conference application on the receiver may only support sending audio and/or visual data to the conference platform and may not support receiving audio and/or visual data from the conference platform. Instead, the collaboration application running on the receiver may receive audio and/or visual data originating from the conference platform (e.g., conference data) from one or more local computing devices. One or more of the local computing devices may process (e.g., decoding and/or decoding) the audio and/or visual data originating from the conference platform such that the audio and/or visual data may be easily and efficiently processed by the receiver with minimal processing power and/or resources. It is understood that visual and/or audio data may be any type of visual and/or audio data whether or not compressed, decompressed, encoded, decoded, encrypted, decrypted, formatted, unformatted and/or derivations and representations thereof.

The local computing devices that are not running the conference application and/or are not participants to the conference may otherwise contribute to the conference via the collaboration system. For example, the collaboration system employed by the conference and collaboration system may be the collaboration system described in U.S. patent application Ser. No. 14/986,468, filed on Dec. 31, 2015, now U.S. Pat. No. 10,560,499, the entire contents of each of which are incorporated herein by reference. The collaboration system in the '468 application (and now '499 patent) includes computing devices that may communicate with one another via a receiver. One or more computing devices may be promoted or otherwise designated as a moderator client device (e.g., moderator computing device) and may control a collaboration session involving the moderator and other computing devices in the collaboration system (e.g., member client devices or member computing devices). Using the collaboration system, the computing devices may share their screens or other data (e.g., images, files, videos, audio, etc.) with other computing devices that are participant in the collaboration session. The moderator computing device may further instruct the receiver to cause a display in communication with the receiver to display the screen and/or other data from one or more moderator and/or member computing devices.

The conference and collaboration system may be employed to cause a receiver, or alternatively a conference device, located in a conference room to join a virtual conference as a participant and obtain and send audio and/or visual data from the conference room (e.g., using a camera and/or microphone in the conference room) to the conference platform and also may cause the receiver to receive audio and/or video data originating from the collaboration platform from a local computing device (e.g., using the collaboration system). The moderator device may cause a display and/or speaker to present such audio and/or visual data via the receiver. Further, a member computing device, not joined to the virtual conference as a participant, may send the receiver data (e.g., images, files, videos, audio, etc.) via the collaboration platform and the receiver, or alternatively the conference device, may cause such data to be sent to the conference platform for presentation on conference participant devices (e.g., a remote device).

The conference device may be in communication with a receiver and may further be in communication with the remote server running the conference platform. The conference device may run a conference application and may receive conference data from the remote server and may send the conference data to the receiver. The conference device may receive collaboration data from the receiver and may send the collaboration data to the remote server to be viewed by a remote device via the conference platform. The conference device may further obtain local audio and/or visual data and may send the local audio and/or visual data to the conference platform to be viewed by a remote device via the conference platform. It is understood that the conference data and/or collaboration data may be any type of conference data and/or collation data whether or not compressed, decompressed, encoded, decoded, encrypted, decrypted, formatted, unformatted and/or derivations and representations thereof.

Referring now to FIG. 1, a schematic illustration of conference and collaboration system 100 is illustrated as well as remote server 120 and remote computing device 150, in accordance with the principles of the present invention. As shown in FIG. 1, the conference and collaboration system 100 may include moderator computing device 110, receiver 105, input device 145, and display 140. The conference and collaboration system 100 may also optionally include member computing device 130. It is understood that the conference and collaboration system 100 may further include additional member computing devices, moderator computing devices, input devices, and/or output devices (e.g., displays, speakers, projectors, etc.). It is further understood that the member computing device may become a moderator computing device (e.g., upon requesting to be a moderator) or all computing devices may be moderator computing device such that each computing device has the same level of control and authority (e.g., the same level of control of the collaboration application). It is also understood that moderator status may be self-selected such that a member device may self-promote such member device to a moderator device and thus may control presentation authority on a display. Alternatively, or additionally, it is further understood that all devices may moderator devices.

The receiver may be in communication with the moderator computing device 110, member computing device 130, display device, 105, input device 145, and/or remote server 120. The receiver may be a computing device (e.g., the device illustrated in FIG. 2A and described below) with a processor and may run one or more applications. It is understood that, receiver 105 and moderator computing device 110, member computing device 130, display 140 and/or remote server 120 may coordinate to perform one or more of the operations described herein with respect to FIG. 1 or otherwise described herein.

The moderator computing device 110, member computing device 130, and/or remote computing device 150 may be any computing device (e.g., the device illustrated in FIG. 2B and described below) with a processor and may include one or more displays, speakers, microphones, and/or one or more cameras. In the example illustrated in FIG. 1, the moderator computing device 110 and member computing device 130, collectively local computing devices, may is a laptop, smartphone, or tablet device including a processor, a display, speaker, microphone, and a camera, however it is understood that one or more device may be a desktop computer, e-reader, wearable device, or the like.

The display device 140 may be any type of computing device including a display and/or a speaker or the like (e.g., television, projector, tablet, monitor, etc.). It is understood that other output devices such as a speaker may be included in conference and collaboration system 100. Input device 145 may be any type of well-known input device such as a camera and/or microphone. The remote server 120 may be one or more computing devices (e.g., one or more servers) in communication with receiver 105, moderator computing device 110, and/or remote computing device 150. Remote server 120 may include one or more servers and/or otherwise communicate with other servers, databases, datastores, and the like.

The receiver 105 and local computing devices (e.g., moderator computing device 110 and member computing device 130) may connect with and/or communicate with the remote server 120 over any well-known wired or wireless connection (e.g., Wi-Fi, cellular network, Bluetooth, Bluetooth Low Energy (BLE), near field communication protocol, cable/coaxial or DSL, etc.). For example, the receiver 105 and/or the local computing devices may communicate with the remote server 120 via the Internet or cellular connection. The local computing devices and ancillary devices (e.g., display 140, input device 145, and/or any other output devices) may connect with and/or communicate with the receiver over any well-known wired or wireless connection (e.g., Wi-Fi Direct, Bluetooth, near field communication protocol, USB, HDMI, etc.). For example, the receiver may be connected to the local computing devices via Wi-Fi and may connect with the ancillary devices via Bluetooth, HDMI and/or USB. It is understood that devices in the conference and collaboration system may communicate via one or more types of connections and one or more devices may communicate via a different type of connection.

Receiver 105 may run a receiver collaboration application and a receiver conference application. It is understood that the receiver collaboration application and a receiver conference application may be the same or different applications. The local devices may each run a device collaboration application and/or a device conference application. The remote server may run a conferencing platform that may support and otherwise facilitate virtual meetings and/or conferencing between moderator computing device 110, member computing device 130, receiver 105, and/or remote computing device 150.

Each computing device (e.g., moderator computing device 110, member computing device 120, receiver 105, and/or remote computing device 150) may generate or obtain visual (e.g., video, images, text) data (e.g., using a camera) and may also generate or obtain audio (e.g., voice, music) data (e.g., using a microphone). Visual and/or audio data may be indicative of video, images, text, voice, music, and the like. Each computing device may include incorporated into the respective computing device a microphone and/or camera to generate the audio and/or visual data and/or may be in communication with an external camera and/or microphone to capture the audio and/or visual data. For example, receiver 105 may be in communication with input device 145 which may include a camera and/or a microphone.

The visual and audio data from each computing device may be sent to the conferencing platform (e.g., running on remote server 120), which may create an interface incorporating the visual data and/or the audio data. For example, the interface may include a video feed from each computing device and may include an audio feed synced in time with the video feed. Audio and/or visual data corresponding to the interface (e.g., conference data) may be sent to the remote computing device 150 and/or one or more components of the conference and collaboration system 100 (e.g., moderator computing device 110). As shown in FIG. 1, the conference data may be sent from remote server 120 to only the moderator computing device. Alternatively, or additionally, conference data may be sent from remote server 120 to receiver 105 and receiver 105 may disregard such incoming conference data. In one example, receiver 105 may have limited processing power and resources and it may be desirable for receiver 105 not to dedicate limited processing resources to incoming conference data from the remote server 120. In this manner, the receiver may send audio and/or visual data to the remote server 120 but may not receive conference audio and/or visual data from the remote server.

At the same time as the moderator computing device 110, member computing device 130 and/or receiver 105 are running respective conference applications and communicating with the conference platform, each device may also run a collaboration application. The collaboration application may be the same collaboration application described in the U.S. patent application Ser. No. 14/986,468, the entire contents of each of which are incorporated herein by reference. Specifically, the collaboration application may employ a content sharing protocol that may permit users of the collaboration application view the content on their individual devices and/or view the content on other devices running the collaboration application. The local computing devices running the collaboration application (e.g., moderator computing device 110 and/or member computing device 130) may be promoted to "moderator" status. A moderator may control the content shared between devices and/or may control the content presented on a display and/or speaker. The moderator also may monitor in real time the screens of other devices. The moderator computing device 110, receiver 105 and member computing devices 130 may be Miracast® compatible.

A content sharing session may be established using the collaboration application and may be initiated by one or more local computing devices running the collaboration application and connecting to receiver 105. Once a session is established and one or more members have joined the session, moderator computing device 110 may control certain aspects of the session. For example, moderator computing device 110 may control which member computing devices 130 participate in the session and what content and/or instructions may be communicated between the moderator computing device 110, member computing device 130, receiver 105, display 140, input device 145 and/or any other output or input devices. Moderator computing device 110 may communicate instructions, tasks, operations, constraints to receiver 105.

A moderator computing device 110 may view the screens of member client devices 130 and optionally may instruct receiver 105 to cause display 140 to display all or a portion of the content on member client device 130. Alternatively, or in addition, moderator computing device 110 may instruct receiver 105 to display all or a portion of the content on moderator computing device 110. In yet another example, moderator client device 110 may instruct receiver 105 to display on display 140 all or a portion of the content on moderator computing device 110 and all or a portion of the content on member computing device 130. It is understood that multiple member computing devices may be included in conference and collaboration system 100. Where there are multiple member computing devices, moderator computing device 110 may instruct receiver to display all or a portion of content from more than one member computing device. A moderator computing device 110 may further delegate control to member computing device 130 such that member computing device 130 may perform any of the tasks performed by moderator computing device 110. A content sharing session also may facilitate file transfers between moderator computing device 110 and member computing devices 130 via receiver 105.

The conference and collaboration system, with moderator computing device 110, receiver 105, and/or member computing device 130 running the collaboration application, may facilitate efficient virtual conferencing by leveraging the collaboration platform. As explained above, receiver 105 may only send audio and/or video data to remote server 120 but may not receive any conference data from remove server 120. As shown in FIG. 1, moderator computing device 110 may both send audio and/or visual data to remote server 120 and receive audio and/or visual data to from remote server 120 (e.g., conference data). Moderator computing device 110 may process (e.g., decode, decompress, decrypt) the conference data from the remote server 120. Further moderator computing device 110 may process (e.g., encode, encrypt, compress) the conference data for easy and/or efficient transmission to and processing by receiver (e.g., using MiraCast protocols). Moderator computing device 110 may further instruct receiver 105 to present the conference data on display 140 and/or any other output device. In this manner, receiver may send audio and/or visual data to the remote server and also receive conference data in a preprocessed form, thereby reducing the processing power necessary for the receiver 105 to participate in the virtual conference.

The collaboration application may further be leveraged by the conference and collaboration system by permitting conference participants such as member computing device 130 to participate in the conference. For example, moderator computing device 110 may share all or a portion of the content of member computing device 130 with remote server 120, either by sending the corresponding audio and/or visual data itself or instructing the receiver to send such data to remove server 120. In this manner, member computing device 130 may share data in the virtual conference without having ever been a participant of the virtual conference.

Figure 2A:
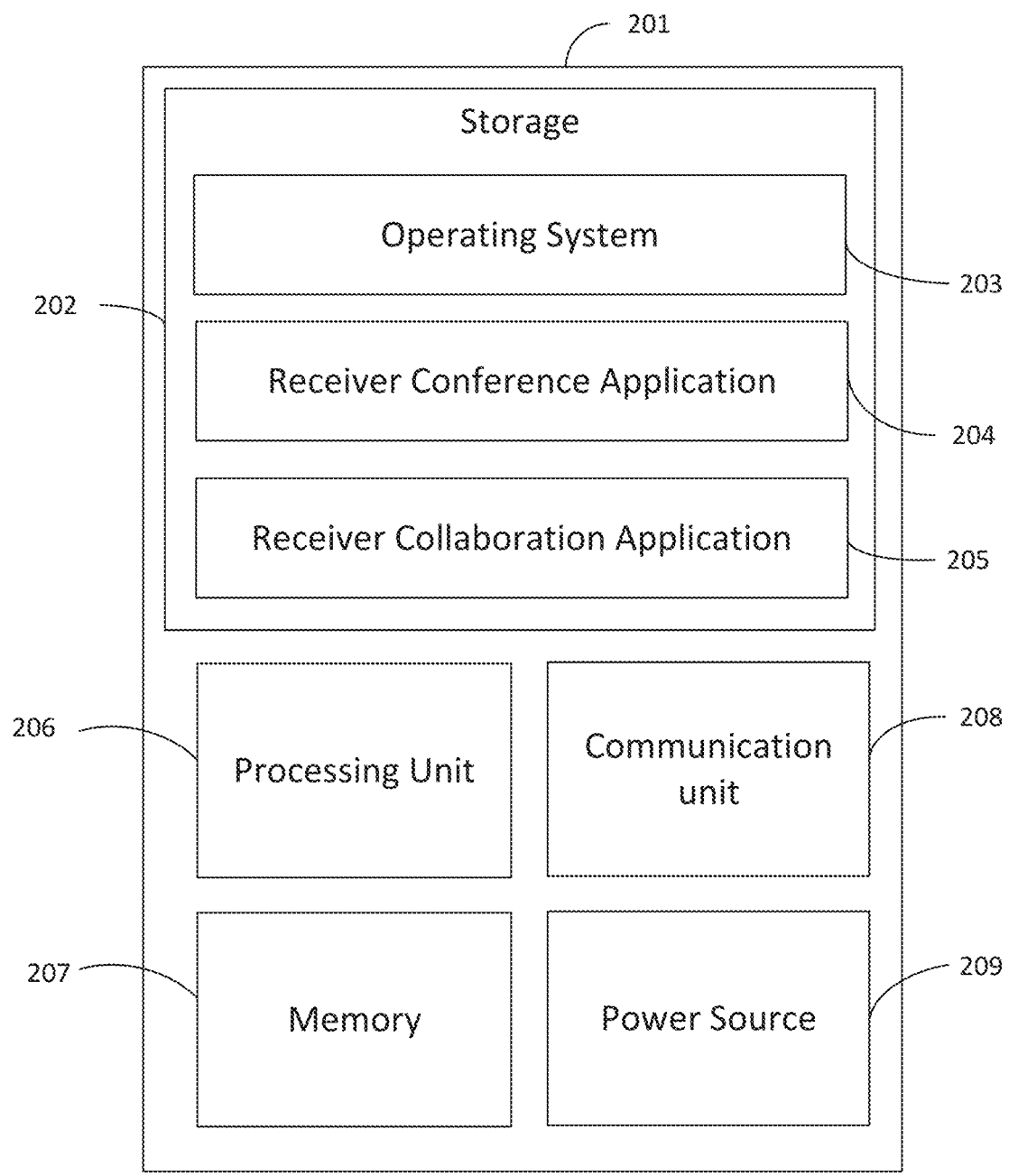
FIGS. 2A-2B are schematic views of the hardware and software components of the receiver and local devices, in accordance with the principles of the present invention.
Figure 2B:
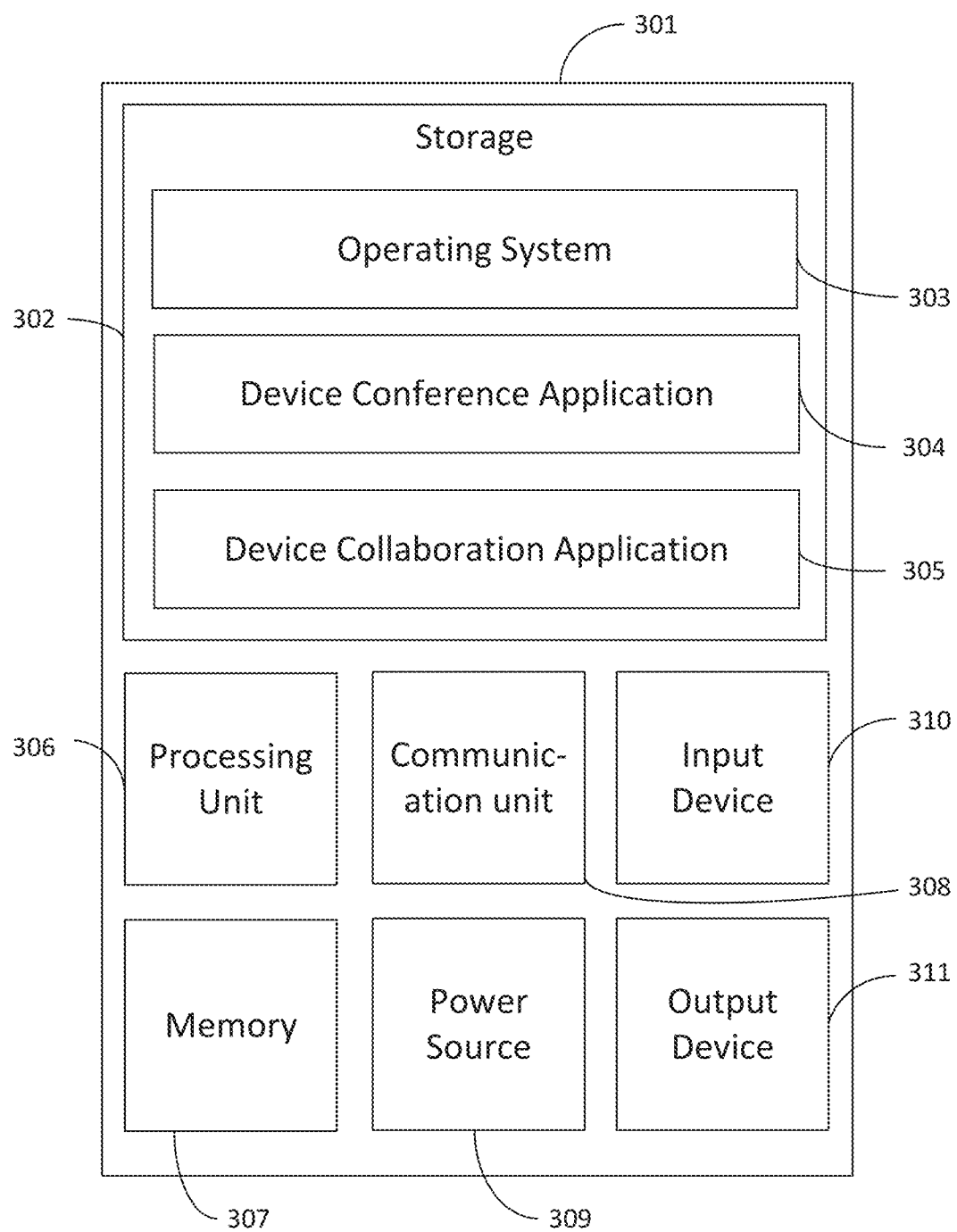

Referring now to FIG. 2A-2B, exemplary functional blocks representing the hardware and software components of the receiver (e.g., receiver 120) and local and/or remote devices (e.g., moderator computing device 110, member computing device 130 and/or remote computing device 150) in the conference and collaboration system are shown, in accordance with the principles of the present invention. Referring now to FIG. 2A, hardware and software components of receiver 201, which may be the same as receiver 120 described above with respect to FIG. 1, are illustrated and may include storage 202, processing unit 206, memory 207, communication unit 208, and power source 209, among other components. Processing unit 206 may be any processor configured to run operating system 203, receiver conference application 204 and/or receiver collaboration application 205 and perform the tasks and operations of the receiver set forth herein. Memory 207 may include, but is not limited to, volatile (e.g. random-access memory (RAM)), non-volatile (e.g. read-only memory (ROM)), flash memory, or any combination thereof.

Storage 202 may be one or more solid-state drive and/or a hard drive and/or any other component for storing and accessing data on a long-term basis. Communication unit 208 may receive and/or transmit information to and from other components in the conference and collaboration system (e.g., local computing devices and/or remote server). Communication unit 208 may be any well-known communication infrastructure facilitating communication over any well-known wired or wireless connection (e.g., Wi-Fi, cellular, Wi-Fi Direct (P2P), Bluetooth™ Bluetooth™ Low Energy (BLE), USB, HDMI, etc.). Power source 209 may be a battery or may connect receiver 201 to a wall outlet or any other external source of power.

Operating system 203, receiver conference application 204, and/or receiver collaboration application 205 may be stored on storage 202 and/or memory 207 and executed on processing unit 206. Operating system 203 may be suitable for controlling the general operation of receiver 201. Receiver conference application 204 and/or receiver collaboration application 205 may be locally run applications or may be cloud based. Receiver conference application 204 may be used to perform conference tasks and/or operations on the receiver. Receiver collaboration application 205 may be used to perform collaboration tasks and/or operations on the receiver.

Receiver collaboration application 205 may be one or more software application or software module and may facilitate collaboration between local devices (i.e., moderator computing devices and/or member computing devices) running a device collaboration application. Receiver collaboration application 205 may be suitable for performing the collaboration operations of receiver 201 set forth herein. Specifically, receiver collaboration application 205 may permit receiver 201 to receive instructions, commands, files and/or data from a moderator and/or member computing device, distribute files and/or data to local devices, send commands and/or instructions to local devices, and revise and/or update files and/or data according to commands and/or instructions. Receiver collaboration application 205 may further cause one or more input devices (e.g., microphone and/or camera) to capture audio and/or visual data and may cause one or more output devices (e.g., display and/or speaker) to present audio and/or visual data. It is understood that device collaboration application 205 may be practiced in conjunction with receiver conference application 204, operating system 203, native applications, a graphics library, other operating systems, and/or any other application programs.

Receiver conference application 204 may be one or more software applications or software modules and may facilitate conferencing between the receiver and a remote server running a conference platform. Receiver conference application 204 may be suitable for performing conferencing operations of receiver 201 set forth herein. Specifically, receiver conference application 204 may permit receiver 201 to distribute files and/or data to the remote server and/or send requests and/or instructions to the remote server. Receiver conference application 204 may further cause one or more input devices (e.g., microphone and/or camera) to capture audio and/or visual data. It is understood that the conference application may be practiced in conjunction with receiver collaboration application 304, operating system 203, native applications, a graphics library, other operating systems, and/or any other application programs. It is further understood that receiver conference application 204 and receiver collaboration application 205 may be the same or different applications and/or modules.

Receiver 201 may have additional features and functionality. For example, receiver 201 may optionally include additional data storage devices (removable and/or non-removable) such as, for example, magnetic disks, optical disks, or tape. It of course is understood that receiver 201 may include additional or fewer components than those illustrated in FIG. 2A and may include more than one of each type of component.

Referring now to FIG. 2B, hardware and software components of a local computing device 301 (e.g., moderator computing device or member computing device), which may be the same as moderator computing device 110 and/or member computing device 130 described above with respect to FIG. 1, are illustrated and may include storage 302, processing unit 306, memory 307, communication unit 308, power source 309, input device 310, and/or output device 311, among other components. Processing unit 306 may be any processor configured to run operating system 303, device conference application 304 and/or device collaboration application 305 and perform the tasks and operations of the local device set forth herein. Memory 307 may include, but is not limited to, volatile (e.g. random-access memory (RAM)), non-volatile (e.g. read-only memory (ROM)), flash memory, or any combination thereof.

Storage 302 may be one or more solid-state drive and/or a hard drive and/or any other component for storing and accessing data on a long-term basis. Communication unit 308 may receive and/or transmit information to and from other components in the conference and collaboration system (e.g., receiver, other local computing devices and/or remote server). Communication unit 308 may be any well-known communication infrastructure facilitating communication over any well-known wired or wireless connection (e.g., Wi-Fi, cellular, Wi-Fi Direct (P2P), Bluetooth™, Bluetooth™ Low Energy (BLE), USB, HDMI, etc.). Power source 309 may be a battery or may connect local computing device 301 to a wall outlet or any other external source of power.

Operating system 303, device conference application 304, and/or device collaboration application 305 may be stored on storage 302 and/or memory 307 and executed on processing unit 306. Operating system 303 may be suitable for controlling the general operation of local computing device 301. Device conference application 304 and/or device collaboration application 305 may be locally run applications or may be cloud based. Device conference application 304 may be used to perform conference tasks and/or operations on the local device. Device collaboration application 305 may be used to perform collaboration tasks and/or operations on the local device.

Device collaboration application 305 may be one or more software application or software modules and may facilitate collaboration between other local devices (i.e., moderator computing devices and/or member computing devices) running a local device collaboration application and/or a receiver running a receiver collaboration application. Device collaboration application 305 may be suitable for performing the collaboration operations of local computing device 301 set forth herein. Specifically, device collaboration application 305 may permit local computing device 301 to receive instructions, commands, files and/or data from a receiver and/or moderator or member computing devices, distribute files and/or data to a receiver and/or local computing device, send commands and/or instructions to the receiver and/or local computing devices, and revise and/or update files and/or data according to commands and/or instructions. Device collaboration application 305 may further cause one or more input devices 310 (e.g., microphone and/or camera) to capture audio and/or visual data and may cause one or more output devices 311 (e.g., display and/or speaker) to present audio and/or visual data. It is understood that input devices 310 and/or output devices 311 may be internal to and/or integrated with local computing device 301 or may be external to local computing device 301. It is understood that device collaboration application 305 may be practiced in conjunction with device conference application 304, operating system 303, native applications, a graphics library, other operating systems, and/or any other application programs.

Device conference application 304 may be one or more software applications or software modules and may facilitate conferencing between the local computing device 301 and a remote server running a conference platform. Device conference application 304 may be suitable for performing conferencing operations of local computing device 301 set forth herein. Specifically, device conference application 304 may permit local computing device 301 to distribute files and/or data to the remote server and/or send commands and/or instructions to the remote server. Further device conference application 304 may facilitate receiving conference data from the remote server. It is understood that the conference application may be practiced in conjunction with device collaboration application 305, operating system 303, native applications, a graphics library, other operating systems, and/or any other application programs. It is further understood that device conference application 304 and device collaboration application 305 may be the same or different applications and/or modules. If is also understood that a local device (e.g., member computing device) may not include device conference application 304.

Local computing device 301 may have additional features and functionality. For example, local computing device 301 may optionally include additional data storage devices (removable and/or non-removable) such as, for example, magnetic disks, optical disks, or tape. It of course is understood that local computing device 301 may include additional or fewer components than those illustrated in FIG. 2B and may include more than one of each type of component.

Figure 3:
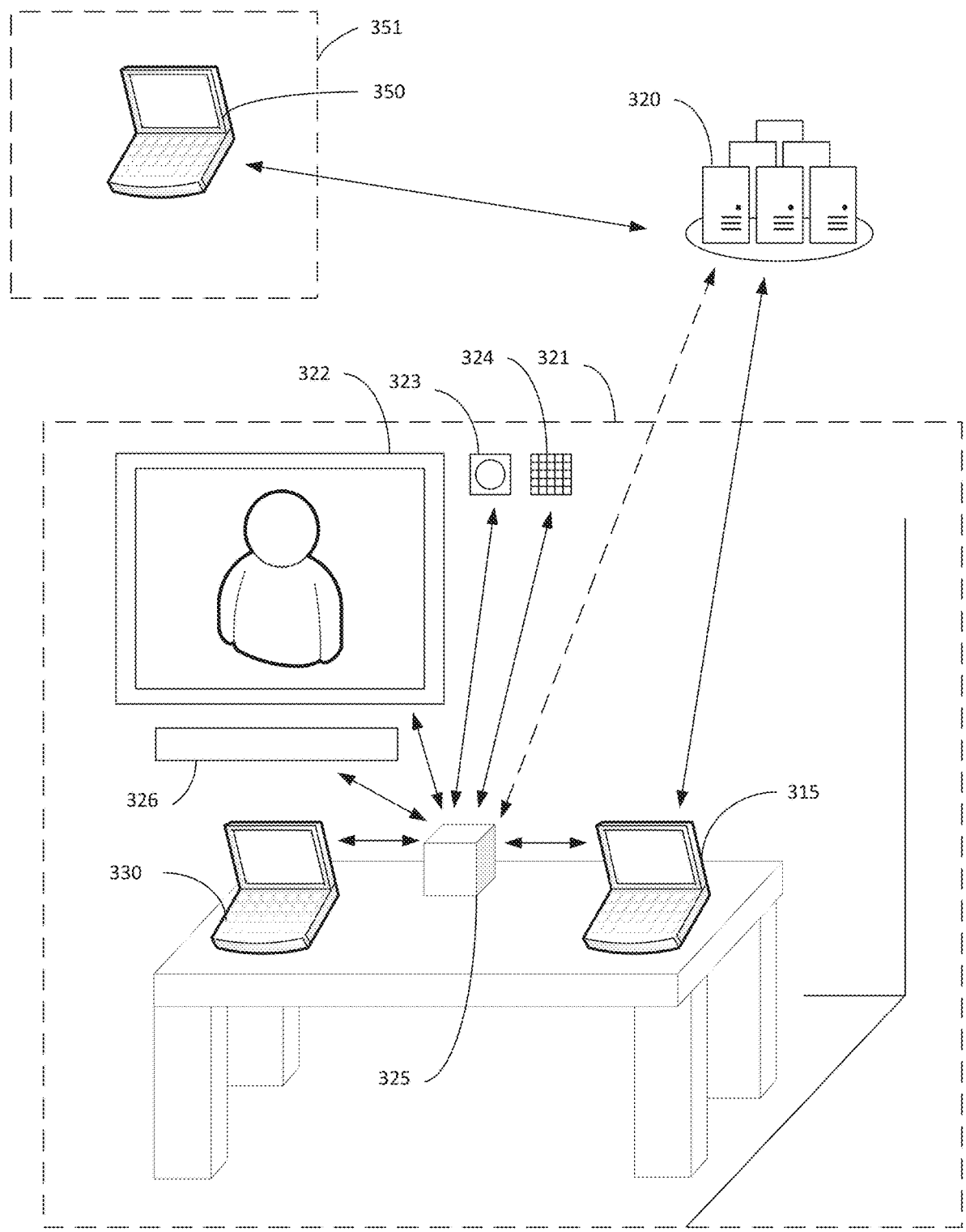
FIG. 3 is a schematic illustration of an example use case showing the conference and collaboration system in a conference room in communication with a remote server and a remote computing device, in accordance with the principles of the present invention.

Referring now to FIG. 3, a schematic illustration of an example use case showing the conference and collaboration system in a conference room in communication with a remote server and a remote computing device is illustrated, in accordance with the principles of the present invention. As shown in FIG. 3, local conference and collaboration system 321 may include receiver 325, which may be the same as receiver 105, moderator computing device 315, which may be the same as moderator computing device 110, member computing device 330, which may be the same as member computing device 130, and display 322, which may be the same as display 140. Local conference and collaboration system 321 may further include speaker 326, which may be any well-known speaker, camera 323, which may be any well-known camera, and/or microphone 324, which may be any well-known microphone.

Receiver 325 may be in communication with moderator computing device 315, member computing device 330, speaker 326, display 322, camera 323 and/or microphone 324. Receiver 325 may further be in communication with remote server 320, which may be the same as remote server 120 and may run the conference platform. The local devices moderator computing device 315 and member computing device 330 may run the device collaboration application as well as the device conference application. The remote computing device 350 may be the same as remote computing device 150 and may run the device conference application. Remote computing device 350 may be at a remote location 351 which may be any distance from local conference and collaboration system 321.

Remote server 320, running the conference platform, may host a conference session that may be joined by remote computing device 350, receiver 325, and moderator computing device 315, all as participants of the virtual conference. For example, the conference platform may send connection information (e.g., conference phone number, conference link, conference meeting number, conference password, and/or any other conference related information) to each participant (e.g., via email, text message, push notification, and/or any other well-known way of sending information).

In the example illustrated in FIG. 3, local conference and collaboration system 321 may be a conference room with multiple local computing devices. As a participant of the conference, receiver 325 may cause camera 323 and/or microphone 324 to capture input data (e.g., visual and audio data of the conference room) and may send such input data to remote server 320. Moderator device 315 may receive conference data (e.g., audio and/or visual data from remote server 320). The conference data may include interface data including audio and/or visual data from one or more participants in the conference.

As moderator computing device 315 may be a participant of the conference, moderator computing device 315 may receive conference data and send the conference data to receiver 325. Prior to sending the conference data to receiver 325, the moderator computing device 315 may decode, decompress, and/or decrypt the conference data received form the remote server and may further encode, compress, and/or encrypt the conference data in a format easily and efficiently processed by receiver 325 (e.g., using MiraCast protocols and/or formats). Upon receiving the conference data, receiver 325 may cause display 322 and/or speaker 326 to present audio and/or visual data in the conference data. In this manner, receiver 325 may only send audio and/or visual data to remote server and may receiver conference data from remote server 320 indirectly via moderator computing device 315. As moderator computing device 315 may perform resource intensive processing (e.g., decoding, decrypting, decompressing) duties, the processing power required to run the receiver conference application may be reduced.

Receiver 325 may further communicate with member computing device 330 which may send files, data (e.g., audio and/or visual data), and/or any other information to receiver 325 via the device collaboration application. For example, moderator computing device 315, via the device collaboration application, may instruct receiver 325 to obtain audio and/or visual data from member computing device 330. Moderator computing device may cause receiver 325 to send such audio and/or visual data directly to remote server 320. Remote server 320 may share the audio and/or visual data from member computing device 330 (e.g., via the conference platform) with remote computing device 350 for presentation on remote computing device 350. In this way, member client device 330 may participate in the virtual conference despite not be a participant in the virtual conference.

While FIG. 3 illustrates moderator client device in communication with remote server 320, alternatively or additionally, member computing device 330 may be in communication with remote server 320 and may otherwise be a participant in the virtual conference. It is understood that more than one moderator computing device, member computing device, and/or remote computing device may be included in the system illustrated in FIG. 3. It is also understood that the local conference and collaboration system may include one or more additional input devices (e.g., camera and/or microphone) and/or one or more additional output devices (e.g., display and/or speaker).

Figure 4:
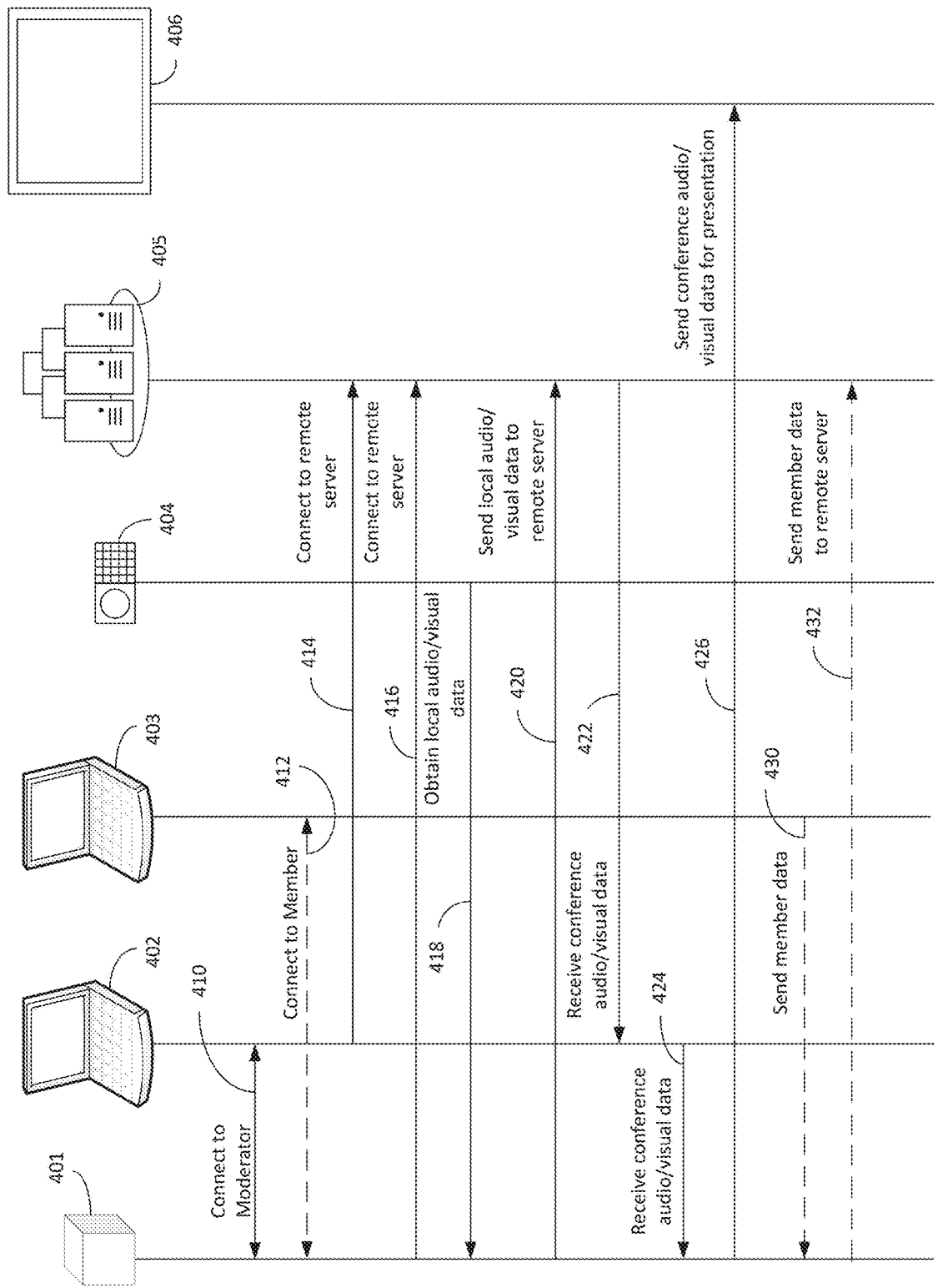
FIG. 4 is a schematic illustration of an example process for locally employing the conference and collaboration system, in accordance with the principles of the present invention.

Referring now to FIG. 4, a schematic illustration of an example process for locally employing the conference and collaboration system is illustrated, in accordance with the principles of the present invention. Some or all of the operations and/or tasks of the process may be optional and/or may be performed in a different order. As shown in FIG. 4, the conference and collaboration system may be initiated at step 410 when moderator computing device 402, which may be the same as moderator computing device 110, connects to receiver 401, which may be the same as receiver 105. In one example, moderator computing device 402 may request to connect to receiver 401 via the device collaboration platform. Similarly, at step 412 member computing device 403, which may be the same as member computing device 130, may connect with receiver 401 (e.g., via the collaboration platform).

At step 414, moderator computing device 402 may connect to a remote server 405 running a conference platform. Remote server 404 may be the same as remote server 120 in FIG. 1. For example, moderator computing device 402 may run device conference application to join a virtual conference hosted on the conference platform as a participant. Similarly, at step 416, receiver 401 may run receiver conference application to join a virtual conference hosted on the conference platform as a participant. Moderator computing device 402 may cause receiver 401 to join the virtual conference as a participant by sending instructions and/or commands to receiver 401 to do so. Alternatively, receiver 401 may include an input and a user may use the input to cause the receiver to join the conference as a participant (e.g., via a touch screen on the receiver).

At step 418, receiver 401 may obtain local audio and/or visual data via input device 404 which may be one or more input devices (e.g., camera, microphone, etc.). At step 420, receiver 401 may sent the local audio and/or visual data to remote server 405. The audio and/or visual data may provide the conference platform images and/or audio from a conference room in which receiver 401 and/or input device 404 are situated. The local audio and/or visual data sent to the remote server may optionally be reformatted (e.g., encoded, decoded, encrypted, decrypted, compressed, decompressed, and the like) in a manner suitable for transmission to and receipt by the remote server. At step 422, remote server 405 may send conference audio and/or visual data to moderator computing device 402. For example, the conference data may be indicative of the audio and/or visual data received from one or more devices in communication with remote server 405 (e.g., receiver 401 or a remote device). The conference audio and/or visual data sent to the moderator computing device may be reformatted (e.g., encoded, decoded, encrypted, decrypted, compressed, decompressed, and the like) in a manner suitable for transmission to and receipt by the moderator computing device. At step 424, moderator computing device 402 may send receiver 401 conference audio and/or visual data. The conference audio and/or visual data sent to the receiver may be reformatted (e.g., encoded, decoded, encrypted, decrypted, compressed, decompressed, and the like) in a manner suitable for transmission to and receipt by the receiver. For example, as explained above, the conference audio and/or visual data received from moderator computing device 402 may be preprocessed by moderator computing device 402 to be easily processed by receiver 401 (e.g., via MiraCast protocols).

At step 426, receiver 405 may send the conference audio and/or visual data to display 406, which may be the same as display 140, for presentation on display 406. At optional step 430, member client device may send member data (e.g., files, audio data, visual data, any other data) to receiver 401 (e.g., via the device collaboration application). Member computing device 403 may include instructions to send such data to remote server 405 or such instructions may come from the moderator device. At step 432, the receiver may send the member data received from member computing device 403 to remote server 405 (e.g., via the conference platform) to be shared with conference participants. The member data sent to the remote server may be reformatted (e.g., encoded, decoded, encrypted, decrypted, compressed, decompressed, and the like) in a manner suitable for transmission to and receipt by the remote server.

Figure 5:
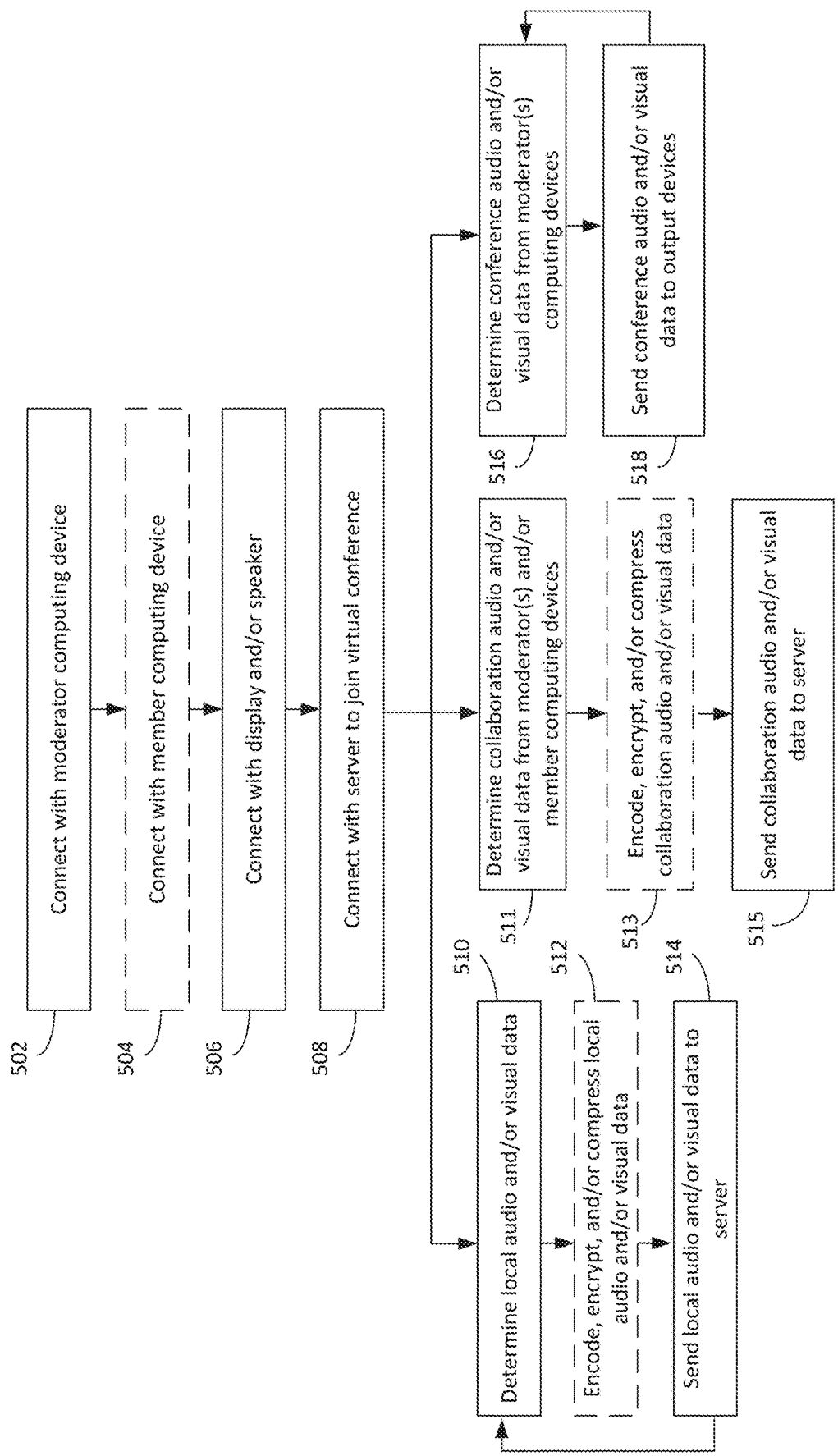
FIG. 5 is a schematic illustration of an example process flow for sending local audio and/or visual data to a server and receiving conference audio and/or visual data from a local device, in accordance with the principles of the present invention.

Referring now to FIG. 5, a schematic illustration of an example process flow for sending audio and/or visual data to a remote server running a conference platform and receiving conference audio and/or visual data from a local device, is illustrated in accordance with the principles of the present invention. For example, the steps illustrated in FIG. 5 may be performed by a receiver that may be the same as receiver 105 of FIG. 1. Some or all of the operations and/or tasks of the process flow may be optional and/or may be performed in a different order.

To initiate the actions of sending audio and/or visual data to a remote server and receiving conference audio and/or visual data from a local device, at block 502 computer-executable instructions stored on a memory of a device, such as receiver, may be executed to connect with a moderator computing device. For example, a moderator computing device may establish a wireless or wired connection with a receiver and may initiate a connection by requesting to join a collaboration session. At optional block 504, computer-executable instructions stored on a memory of a device, such as receiver, may be executed to connect with a member computing device. For example, a member computing device may establish a wireless or wired connection with a receiver and may initiate a connection by requesting to join a collaboration session.

At block 506, computer-executable instructions stored on a memory of a device, such as receiver, may be executed to connect with one or more external output devices (e.g., displays and/or speakers) via a wired or wireless connection. For example, a receiver may connect to an external display via an HDMI connection and/or a speaker via a Bluetooth connection. Alternatively, or additionally, one or more output devices may be integrated into the receiver. At block 508, computer-executable instructions stored on a memory of a device, such as receiver, may be executed to connect with a server (e.g., remote server running the conference platform) to join a virtual conference. For example, a moderator computing device may instruct or otherwise cause receiver to join a virtual conference as a participant.

At block 510, computer-executable instructions stored on a memory of a device, such as receiver, may be executed to determine local audio and/or visual data (e.g., from one or more input devices). For example, the receiver may connect with an external camera via HDMI and/or an external microphone via Bluetooth to obtain local audio and/or visual data. At optional block 512, computer-executable instructions stored on a memory of a device, such as receiver, may be executed to encode, encrypt, and/or compress the local audio and/or visual data for transmission. At block 514, computer-executable instructions stored on a memory of a device, such as receiver, may be executed to send the local audio and/or visual data to the server (e.g., remote server running the conference platform). The receiver may be programmed to periodically send such data to the server and block 510 may be reinitiated.

The receiver may additionally, or alternatively, determine collaboration audio and/or visual data (e.g., non-participant audio and/or visual data) via the collaboration platform (e.g., receiver collaboration application and device collaboration application). Specifically, at block 511, computer-executable instructions stored on a memory of a device, such as the receiver, may be executed to receive the collaboration audio and/or visual data, or any other data, commands, instructions, or files, from one or more moderator computing device and/or member computing devices, including devices that are not joined to the conference as a participant. At optional block 513, computer-executable instructions stored on a memory of a device, such as receiver, may be executed to encode, encrypt, and/or compress the collaboration audio and/or visual data for transmission. At block 515, computer-executable instructions stored on a memory of a device, such as receiver, may be executed to send the collaboration audio and/or visual data to the server (e.g., remote server running the conference platform). After block 515, block 513 may be reinitiated. It is understood that the collaboration audio and/or visual data may include audio and/or visual data from one or more moderator and/or member computing devices (e.g., in a split screen format).

The receiver may additionally, or alternatively, determine conference audio and/or visual data via the collaboration platform (e.g., receiver collaboration application and device collaboration application). Specifically, at block 516, computer-executable instructions stored on a memory of a device, such as receiver, may be executed to receive audio and/or visual data, or any other data, commands, instructions, or files, from one or more moderator computing devices. At block 518, computer-executable instructions stored on a memory of a device, such as receiver, may be executed to send the data received from the one or more moderator computing devices via the collaboration platform to one or more output devices (e.g., display and/or speaker) for presentation of the conference audio and/or visual data. After block 518, block 516 may be reinitiated.

Figure 6:
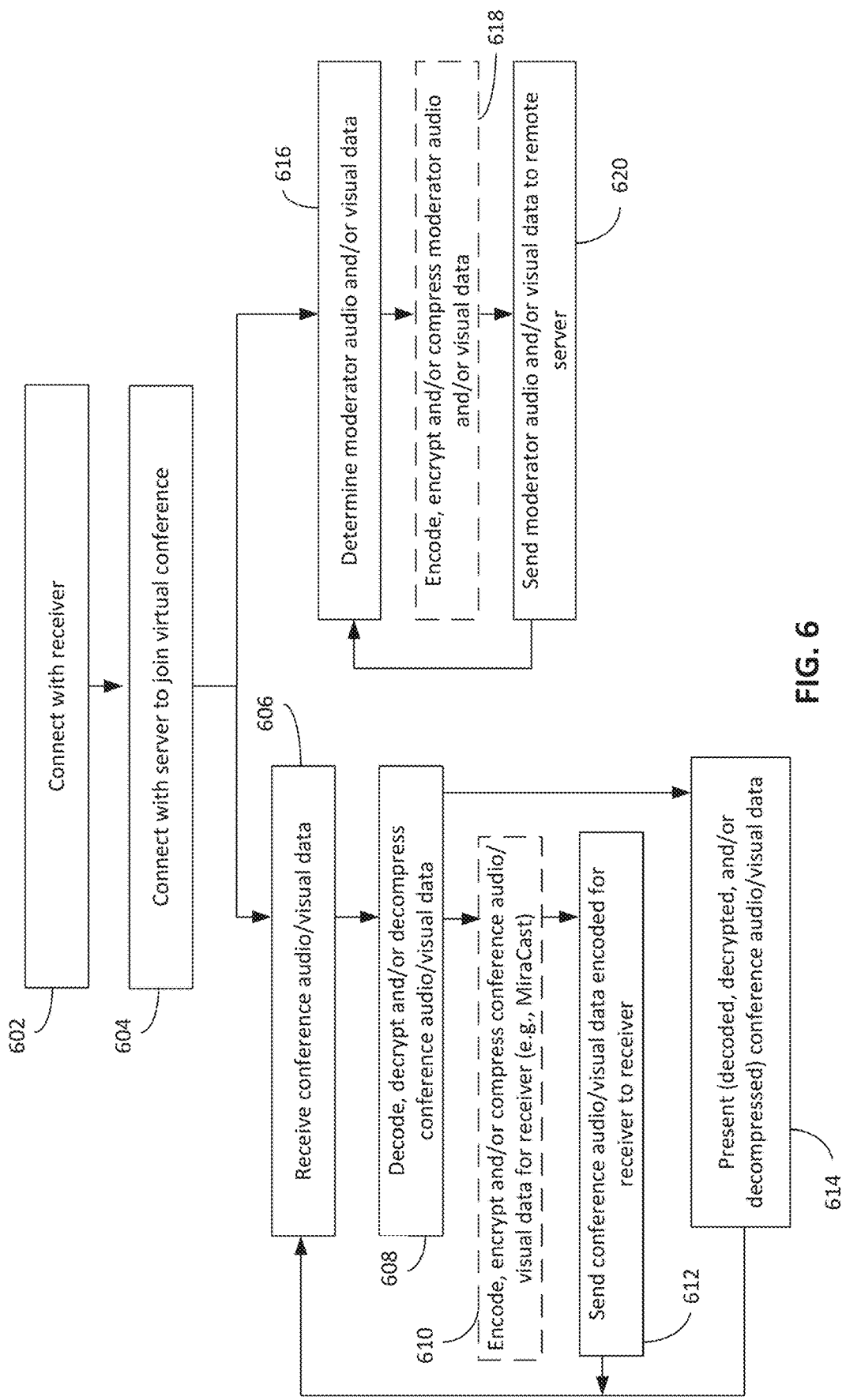
FIG. 6 is a schematic illustration of an example process flow for presenting and sending conference audio and/or visual data to a receiver, in accordance with the principles of the present invention.

Referring now to FIG. 6, is a schematic illustration of an example process flow for presenting and sending conference audio and/or visual data on a local device is illustrated in accordance with the principles of the present invention. Some or all of the operations and/or tasks of the process flow may be optional and/or may be performed in a different order. To initiate the actions of presenting and sending audio and/or visual data, at block 602 computer-executable instructions stored on a memory of a device, such as moderator computing device, may be executed to connect with a receiver. For example, a moderator computing device may establish a wireless or wired connection with a receiver and may initiate a connection by requesting to join a collaboration session.

At block 604, computer-executable instructions stored on a memory of a device, such as moderator computing device, may be executed to connect with a server (e.g., remote server running the conference platform) to join a virtual conference hosted on the conference platform. At block 606, computer-executable instructions stored on a memory of a device, such as moderator computing device, may be executed to receive conference audio and/or visual data from the remote server (e.g., via the conference platform). At block 608, computer-executable instructions stored on a memory of a device, such as moderator computing device, may be executed to decode, decrypt, and/or decompress the conference audio and/or visual data.

At block 614, the computer-executable instructions stored on a memory of a device, such as moderator computing device, may be executed to present the decoded, decrypted and/or decompressed conference audio and/or visual data (e.g., on a display of the moderator computing device). For example, a moderator computing device may cause the visual conference data to be displayed on an integrated display of the moderator computing device and/or may cause the audio conference data to be presented on the moderator computing device. Also after block 608, at optional block 610, the computer-executable instructions stored on a memory of a device, such as moderator computing device, may be executed to encode, encrypt and/or compress the conference data decoded, decrypted and/or decompressed at block 608 in a manner easily processed by the receiver. For example, the moderator computing device may encode the conference data according to MiraCast protocols.

At block 612, the computer-executable instructions stored on a memory of a device, such as moderator computing device, may be executed to send the conference audio and/or visual data to the receiver. The conference audio and/or visual data may be the data encoded to facilitate processing by the receiver at step 610. The moderator computing device may further instruct the receiver to present the conference audio and/or visual data via one or more output devices. For example, the moderator computing device may instruct the receiver to display the conference visual data via a display and present the conference audio data via a speaker. After block 612 and/or 614, block 606 may be reinitiated.

In addition to steps 606-614, or alternatively, block 616 may be initiated after block 604. At block 616, the computer-executable instructions stored on a memory of a device, such as moderator computing device, may be executed to determine moderator audio and/or visual data. For example, the moderator computing device may obtain audio and/or visual data via input devices (e.g., microphone and/or camera integrated into the moderator computing device). At optional block 618, the computer-executable instructions stored on a memory of a device, such as moderator computing device, may be executed to encode, encrypt and/or compress the moderator audio and/or visual data for transmission to the remote server. At block 620, the computer-executable instructions stored on a memory of a device, such as moderator computing device, may be executed to send the audio and/or visual data (e.g., encoded audio and/or visual data) to the remote server (e.g., via the conference platform).

Figure 7:
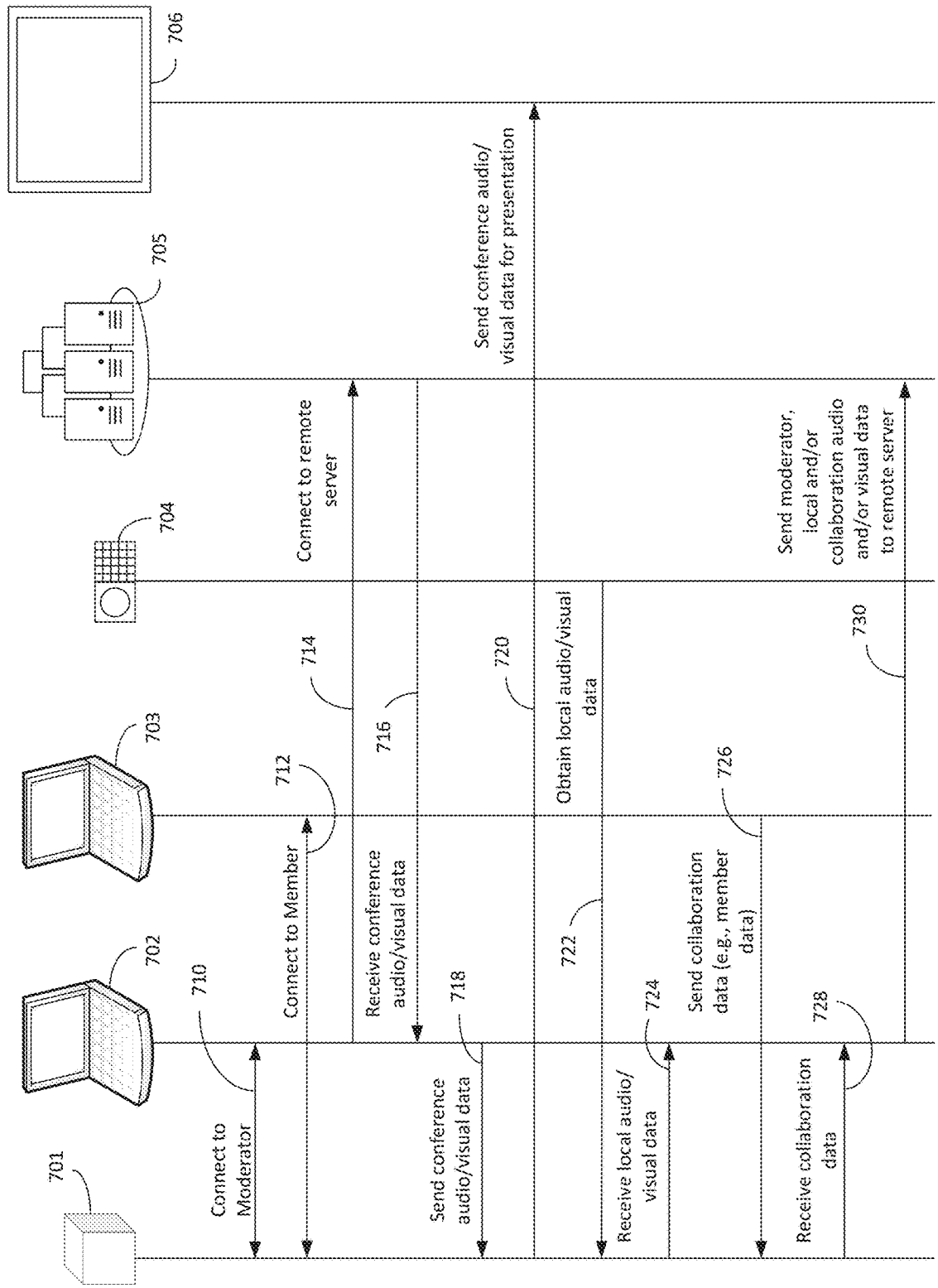
FIG. 7 is a schematic illustration of an example process for employing a conference and collaboration system including a moderator in communication with the remote server, in accordance with the principles of the present invention.

Referring now to FIG. 7, a schematic illustration of an example process for employing the conference and collaboration system to communicate with the remote server via the moderator is illustrated, in accordance with the principles of the present invention. For example, moderator computing device 702 may be situated in a conference room with one or more member computing devices (e.g., member computing device 703), receiver 701, input device 704 and display 706. Moderator device 702 may be in communication with remote server 705 and receiver 701. Receiver 701 may be in communication with moderator computing device 702, one or more member devices 703, input device 704 and display 706. It is understood that some or all of the operations and/or tasks of the process illustrated in FIG. 7 may be optional and/or may be performed in a different order.

As shown in FIG. 7, the conference and collaboration system may be initiated at step 710 when moderator computing device 702, which may be the same as moderator computing device 110, connects to receiver 701, which may be the same as receiver 105. In one example, moderator computing device 702 may request to connect to receiver 701 via the device collaboration platform. Similarly, at step 712 member computing device 703, which may be the same as member computing device 130, may connect with receiver 701 (e.g., via the collaboration platform).

At step 714, moderator computing device 702 may connect to a remote server 705 running a conference platform. Remote server 704 may be the same as remote server 120 in FIG. 1. For example, moderator computing device 702 may run device conference application to join, as a participant, a virtual conference hosted on the conference platform. At step 716, remote server 705 may send conference audio and/or visual data to moderator computing device 702. For example, the conference data may be indicative of the audio and/or visual data received by remote server 705 in communication with one or more other devices (e.g., a remote device).

At step 718, moderator computing device 702 may send receiver 701 conference audio and/or visual data. The conference audio and/or visual data received from moderator computing device 702 may be preprocessed by moderator computing device 702 to be easily processed by receiver 701 (e.g., via MiraCast protocols). At step 720, receiver 701 may send the conference audio and/or visual data to display 706, which may be the same as display 140, for presentation on display 706.

At step 722, receiver 701 may obtain local audio and/or visual data via input device 704, which may be one or more input devices (e.g., camera, microphone, etc.). At step 724, receiver 701 may send the local audio and/or visual data to moderator computing device 702 (e.g., via the device collaboration application"). The local audio and/or visual data may correspond to images and/or audio captured from a room or location where input device 704 is situated. At step 726, member client device 703 may send collaboration audio and/or visual data (e.g., files, audio data, visual data, any other data) to receiver 701 (e.g., via the device collaboration application).

At step 728, receiver 701 may share the collaboration audio and/or visual data received from member computing device 703 with moderator computing device 702 (e.g., via the device collaboration application). At step 730, moderator client device 702 may send one or more of the collaboration audio and/or visual data, local audio and/or visual data, and/or moderator audio and/or visual data to remote server 705 (e.g., via device conference application and conference platform). In this manner, audio and/or visual data form the moderator computing device 702, member computing device 703 and/or input device 704 may be shared with the conference platform.

Figure 8:
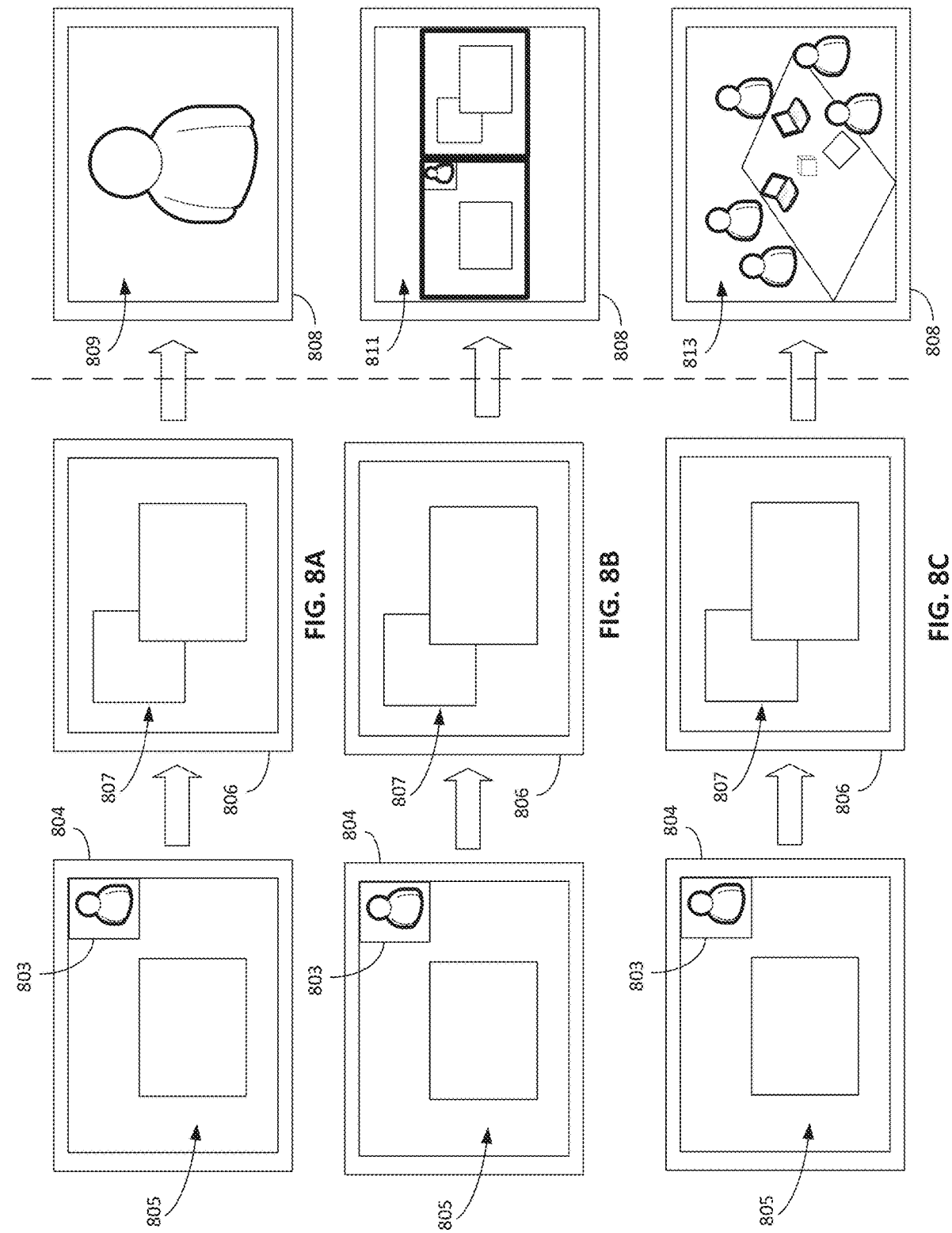
FIGS. 8A-8C are schematic illustrations of exemplary member, moderator, and computing device displays, in accordance with the principles of the present invention.

Referring now to FIGS. 8A-8C, exemplary displays of the device conference application and conference platform are depicted, in accordance with the principles of the present invention. As shown in FIGS. 8A-8C, moderator computing device 804 which may be the same as moderator computing device 110, member computing device 806 which may be the same as member computing device 130, and remote computing device 808 which may be the same as remote computing device 150 are illustrated.

In FIG. 8A-8C, moderator computing device 804 may include display 805, which include camera view 803. Camera view 803 may present visual data generated by a camera connected to or in communication with moderator computing device 804. For example, camera view 803 may show an image or video of a user using moderator computing device 804. Member computing device 806 may include display 807. Additionally, remote computing device 808 may include display 809, display 811, and/or display 813.

As shown in FIG. 8A, moderator computing device 804 may only share camera view 803 with the conference platform and thus display 809 of remote computing device 808 may only present camera view 803 on display 809. Alternatively, as shown in FIG. 8B, moderator computing device 804 may share the displays of moderator computing device 804 and member computing device 806 with the conference platform and thus display 805 and display 807 may be displayed on display 811 of remote computing device 808. In yet another example, as shown in FIG. 8C, moderator computing device 804 may receive local visual and/or audio data generated by an input device and may only share the local visual and/or audio data with the conference platform and thus only the local visual and/or audio data may be presented on display 813 of remote computing device 808.

Figure 9:
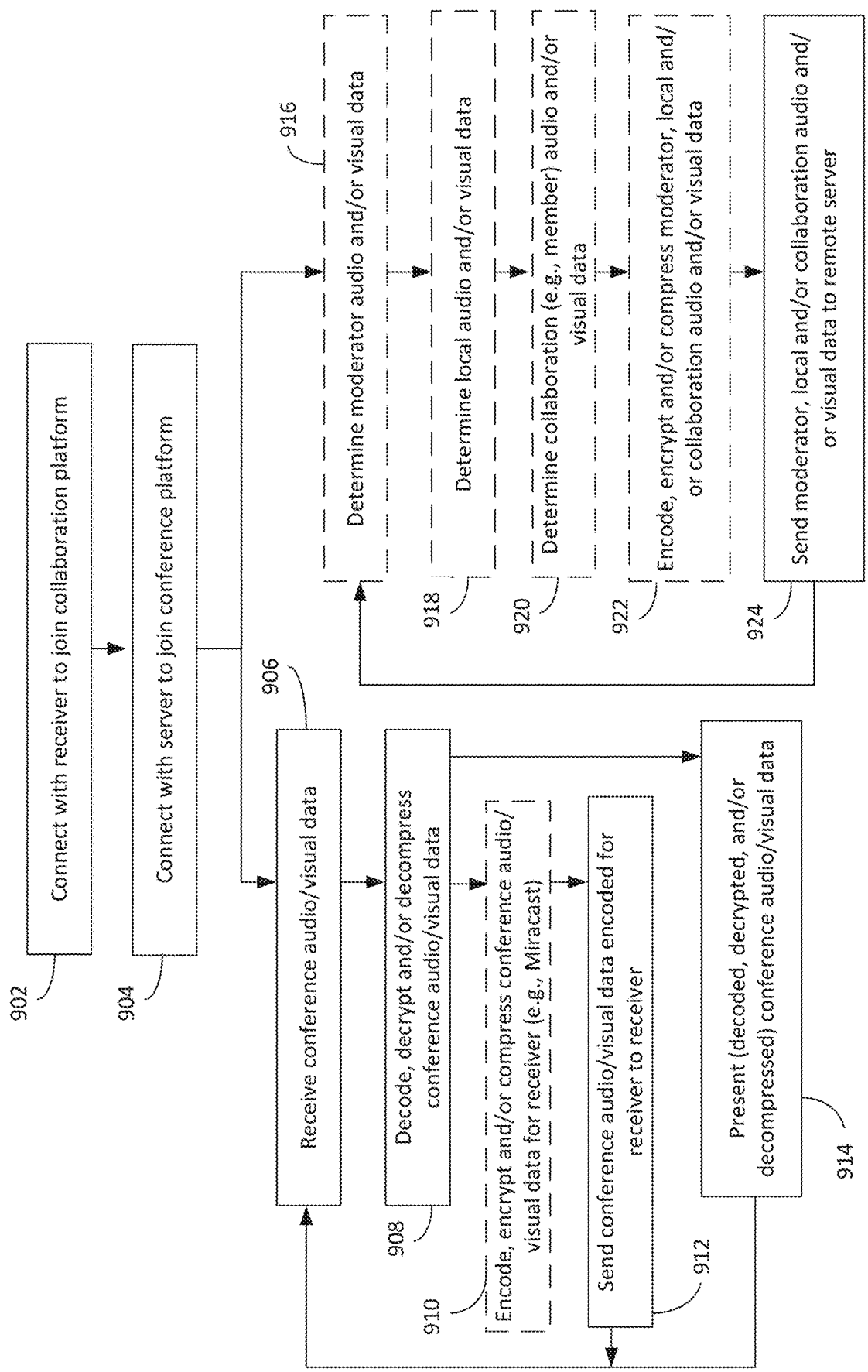
FIG. 9 is a schematic illustration of an example process flow for a moderator device in communication with a remote server and receiver, in accordance with the principles of the present invention.

Referring now to FIG. 9, an exemplary process flow for a moderator computing device in communication with a remote server and a receiver and facilitating communications between a member device and a remote server running a conference platform are illustrated, in accordance with the principles of the present invention. Some or all of the operations and/or tasks of the process flow of FIG. 9 may be optional and/or may be performed in a different order.

To initiate the actions of facilitating communications between the member computing device and the remote server running a conference platform, at block 902 computer-executable instructions stored on a memory of a device, such as moderator computing device, may be executed to connect with a receiver running a collaboration platform to join the collaboration platform (e.g., via a device collaboration application). For example, a moderator computing device may establish a wireless or wired connection with a receiver and may initiate a connection by requesting to join a collaboration session.

At block 904 computer-executable instructions stored on a memory of a device, such as moderator computing device, may be executed to connect with a remote server running a conference platform to join the conference platform (e.g., via a device conference application). At block 906, computer-executable instructions stored on a memory of a device, such as moderator computing device, may be executed to receive conference audio and/or visual data from the remote server (e.g., via the conference platform). At block 908, computer-executable instructions stored on a memory of a device, such as moderator computing device, may be executed to decode, decrypt, and/or decompress the conference audio and/or visual data.

At block 914, the computer-executable instructions stored on a memory of a device, such as moderator computing device, may be executed to present the decoded, decrypted and/or decompressed conference audio and/or visual data (e.g., on a display of the moderator computing device). For example, a moderator computing device may cause the visual conference data to be displayed on an integrated display of the moderator computing device and/or may cause the audio conference data to be presented on the moderator computing device.

Also after block 908, at optional block 910, the computer-executable instructions stored on a memory of a device, such as moderator computing device, may be executed to encode, encrypt and/or compress the conference data decoded, decrypted and/or decompressed at block 908 in a manner easily processed by the receiver. For example, the moderator computing device may encode the conference data according to Miracast protocols.

At block 912, the computer-executable instructions stored on a memory of a device, such as moderator computing device, may be executed to send the conference audio and/or visual data to the receiver. The conference audio and/or visual data may be the data encoded to facilitate processing by the receiver at step 910. The moderator computing device may further instruct the receiver to present the conference audio and/or visual data via one or more output devices. After block 912 and/or 914, block 906 may be reinitiated.

In addition to steps 906-914, optional block 916 may be initiated after block 904. At optional block 916, the computer-executable instructions stored on a memory of a device, such as moderator computing device, may be executed to determine moderator audio and/or visual data. For example, the moderator computing device may obtain audio and/or visual data via input devices (e.g., microphone and/or camera integrated into the moderator computing device) and/or may determine audio and/or visual data presented on the display of the moderator computing device and/or accessible or saved by the moderator computing device.

At optional block 918, the computer-executable instructions stored on a memory of a device, such as moderator computing device, may be executed to determine local audio and/or visual data via the collaboration platform. For example, a receiver may be instructed send and/or share local audio and/or visual data with the moderator computing device. The local audio and/or visual data may include audio and/or visual data received from one or more input devices (e.g., via the receiver).

At optional block 920, the computer-executable instructions stored on a memory of a device, such as moderator computing device, may be executed to determine collaboration audio and/or visual data via the collaboration platform. For example, a receiver running the collaboration platform may be instructed to send and/or share collaboration audio and/or visual data with the moderator computing device. The collaboration audio and/or visual data may include audio and/or visual data received from one or more member computing device.

At optional block 922, the computer-executable instructions stored on a memory of a device, such as moderator computing device, may be executed to encode, encrypt and/or compress the moderator, local and/or collaboration audio and/or visual data for transmission to the remote server. At block 924, the computer-executable instructions stored on a memory of a device, such as moderator computing device, may be executed to send the moderator, local and/or collaboration audio and/or visual data (e.g., encoded audio and/or visual data) to the remote server (e.g., via the conference platform). After block 924, block 916 may be reinitiated.

Figure 10:
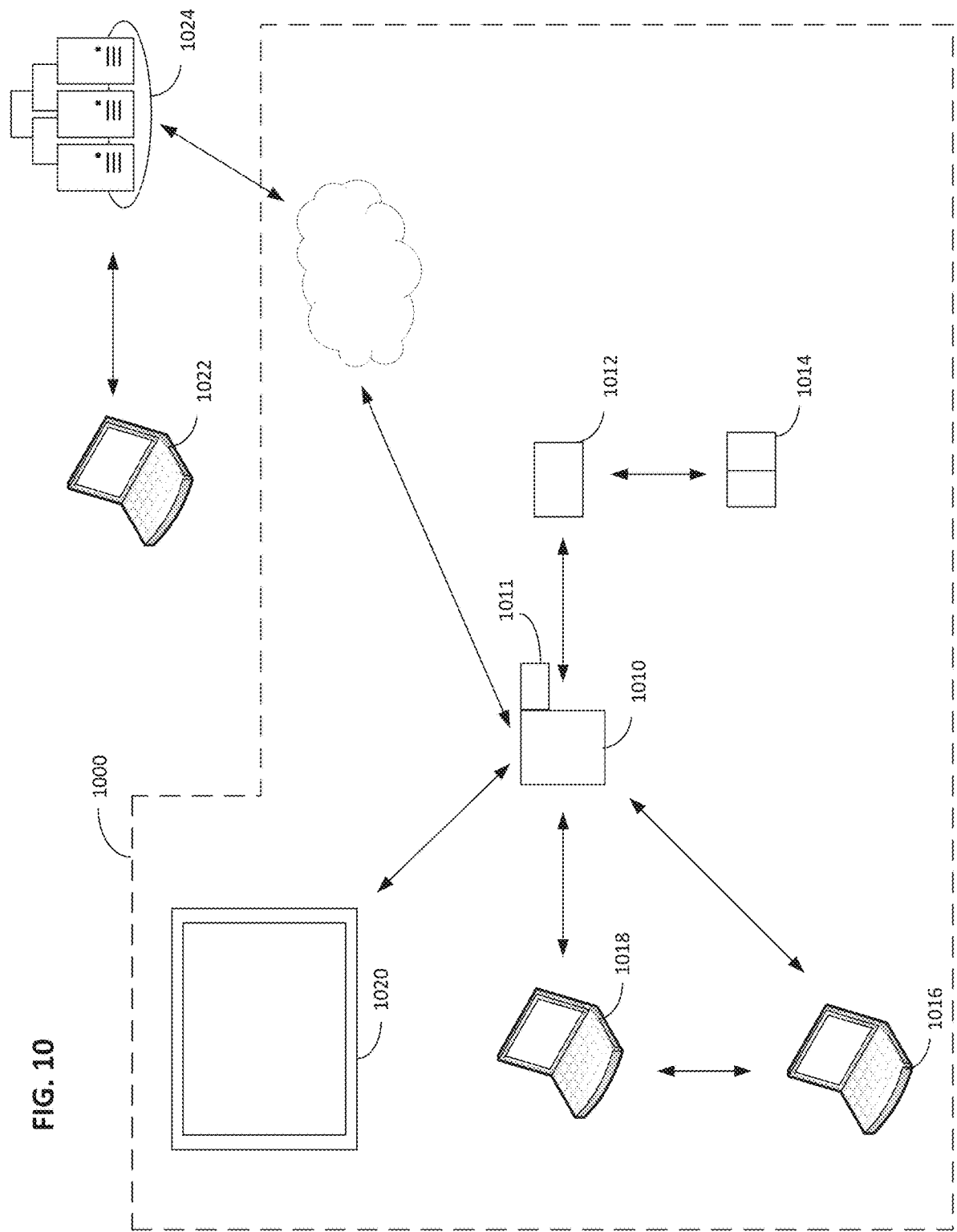
FIG. 10 is a schematic illustration of the conference and collaboration system including a conference device in communication with a remote server and a receiver, in accordance with the principles of the present invention.

Referring now to FIG. 10, a schematic illustration of conference and collaboration system 1000 is illustrated as well as remote server 1024 and remote computing device 1022, in accordance with the principles of the present invention. Remote server 1024 may be the same as remote server 120 and remote computing device 1022 may be the same as remote computing device 150. As shown in FIG. 10, conference and collaboration system 1000 may include moderator computing device 1016, member computing device 1018, receiver 1010, input device 1014, conference device 1012, and display 1020. Moderator computing device 1016 may be the same as moderator computing device 110, member computing device 1018 may be the same as member computing device 130, receiver 1010 may be the same as receiver 105, input device 1014 may be the same as input device 145, and display 1020 may be the same as display 140. It is understood that the conference and collaboration system 1000 may further include additional or fewer member computing devices, moderator computing devices, input devices, and/or output devices (e.g., displays, cameras, speakers, microphones, projectors, etc.).

Receiver 1010 may include and/or may be coupled to HDMI switch 1011 including multiple HDMI inputs and at least one HDMI output. HDMI switch 1011 may permit receiver 1010 to selectively connect an HDMI input to an HDMI output. For example, if the HDMI switch has a first HDMI input and a second HDMI input, and one HDMI output, receiver 1010 may select which HDMI input will be connected to the HDMI output via HDMI switch 1011. In one example, the first HDMI input may be connected to a receiver and may receive collaboration data and the second HDMI input may be connected to the conference device and may receive conference data. Further, the HDMI output may be connected to display 1020. In this manner, receiver 1010 may switch HDMI switch 1011 between the first and second input to alternate between outputting collaboration data and conference data. It is understood that the HDMI switch may be incorporated into receiver 1010, or alternatively, may be a standalone component that is coupled to and/or controlled by receiver 1010.

The conference device 1012 may be any computing device with a processor. Conference device 1012 may be the same as local computing device 301 as shown in FIG. 2B, except without the collaboration application and only optionally including input device 310. In the example illustrated in FIG. 10, the conference device 1012 may be a laptop, smartphone, desktop computer, or tablet device including a processor, or the like. In one example, conference device 1012 and receiver 1010 may be the same device, receiver 1010 may incorporate conference device 1012 (e.g., conference device may be embedded with receiver 1010), and/or conference device 1012 and receiver 1010 may be tightly coupled. It is further understood that input device 1014 may be incorporated into or otherwise coupled to conference device 1012 or may be a separate device that may be in communication with conference device 1012 (e.g., via any well-known wired or wireless communication technologies).

As shown in FIG. 10, receiver 1010 may be in communication (e.g., directly and/or indirectly via HDMI switch 1011) with conference device 1012, moderator computing device 1016, member computing device 1018, and display device 1020. Receiver 1010 may communicate with moderator computing device 1016, member computing device 1018, and/or display device 1020 via any well-known wired or wireless communication technologies (e.g., Wi-Fi, cellular, Wi-Fi Direct (P2P), Bluetooth™, Bluetooth™ Low Energy (BLE), USB, etc.). In one example, receiver 1010 may communicate with and/or be connected to conference device 1012 via HDMI, WiFi, USB and/or Ethernet connections, receiver 1010 may communicate with display 1020 via an HDMI connection, and receiver 1010 may communicate with moderator device 1016 and/or member device 1018 via a WiFi connection. Moderator computing device 1016 and member computing device 1018 may be in communication with one another (e.g., via any well-known wires or wireless communication technologies). Conference device 1012 may communicate with remote server 1024 via receiver 1010 (e.g., via an Ethernet connection between conference device 1012 and receiver 1010).

Moderator computing device 1016, member computing device 1018, receiver 1010 may each run a collaboration application and communicate with one another via the collaboration platform (e.g., receiver collaboration application and device collaboration application). Conference device 1012 may run the conference application and may communicate with the conference platform running on remote server 1024 via receiver 1010. Conference device 1012 may communicate indirectly (e.g., via receiver) with moderator computing device 1016 and receive instructions from moderator computing device 1016.

Figure 11:
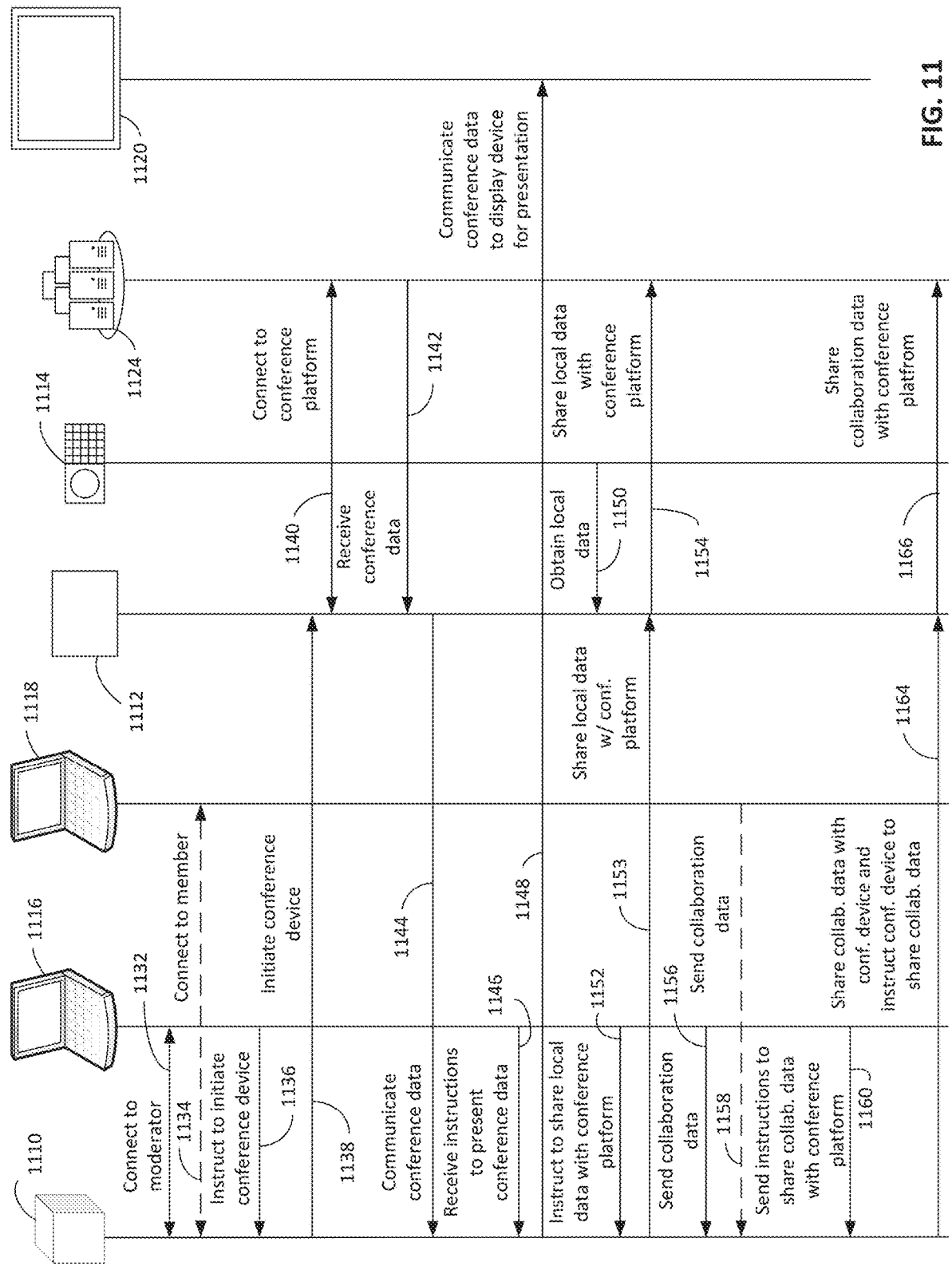
FIG. 11 is a schematic illustration of an example process for employing a conference and collaboration system including a conference device in communication with the remote server and receiver, in accordance with the principles of the present invention.

Referring now to FIG. 11, a schematic illustration of an example process for employing the conference and collaboration system including a conference device is illustrated, in accordance with the principles of the present invention. The conference and collaboration system may include receiver 1110, which may be the same as receiver 1010 and may include and/or be coupled to an HDMI switch, member device 1118, which may be the same as member device 1018, moderator computing device 1116, which may be the same as moderator computing device 1016, conference device 1112, which may be the same as conference computing device 1012, input device 1114, which may be the same as input device 1014, remote server 1124, which may be the same as remote server 1024 and/or display device 1120, which may be the same as display device 1020.

Some or all of the operations and/or tasks of the process in FIG. 11 may be optional and/or may be performed in a different order. As shown in FIG. 11, the conference and collaboration system may be initiated at step 1132 when moderator computing device 1116 connects to receiver 1110 (e.g., via the collaboration application). In one example, moderator computing device 1116 may request to connect to receiver 1110 via the collaboration platform. Similarly, at step 1134 member computing device 1118 may connect with receiver 1110 (e.g., via the collaboration platform).

At step 1136, moderator computing device 1118 may connect to receiver (e.g., via Wi-Fi or any other well-known wired or wireless technology) and may instruct receiver 1110 to initiate conference device 1112 and/or otherwise instruct conference device 1112 to connect to the conference platform running on remote server 1124 via a conference application running on conference device 1112. At step 1138, receiver 1110 may connect with conference device 1112 and instruct conference device 1112 to connect to the conference platform running on remote server 1124. Receiver 1110 may be connected to conference device via HDMI, Ethernet and/or Wi-Fi.

At step 1140, conference device 1112, may connect to conference platform running on remote server 1124. As explained above, conference device 1112 may be instructed to join the conference platform at step 1136. At step 1142, conference device 1112 receive conference data from the conference platform. The conference data may be indicative of audio and/or visual data from a remote device.

At step 1144, conference device 1112 may communicate or otherwise share conference data with receiver 1110 and/or an HDMI switch embedded or coupled to receiver 1110. For example, conference device 1112 may communicate conference data to receiver 1110 and/or an HDMI switch via an HDMI connection. At step 1146, moderator computing device 1116 may instruct receiver 1110 to present conference data (e.g., on a display device). At step 1148, receiver 1110 may cause the conference data to be directed to display device (e.g., via the HDMI switch) 1120 for presentation via display device 1120.

At step 1150, conference device 1112 may receive local data from input device 1114, which may be one or more input devices and may be a standalone device and/or incorporated into conference device 1112. Local data may be local audio and/or visual data (e.g., from a room or area in which input device 1114 is situated). At step 1152, moderator computing device 1116 may send instructions to receiver 1110 to cause conference device 1112 to share the local data with the conference platform. At step 1153, receiver may send instructions to conference device 1112 to share the local data with the conference platform (e.g., via WiFi, USB or Ethernet). At step 1154, conference device 1112 may share the local data with the conference platform for presentation on the remote computing device. The local data sent to the conference platform running on the remote server may be reformatted (e.g., encoded, decoded, encrypted, decrypted, compressed, decompressed, and the like) in a manner suitable for transmission to and receipt by the remote server.

At step 1156, moderator computing device 1116 may send collaboration data generated on the collaboration platform to receiver 1110 via the collaboration application. The collaboration data sent to the receiver may be reformatted (e.g., encoded, decoded, encrypted, decrypted, compressed, decompressed, and the like) in a manner suitable for transmission to and receipt by the receiver. Additionally, or alternatively, member computing device 1118 may send collaboration data generated on the collaboration platform to receiver 1110 via the collaboration application. The collaboration data sent to the receiver may be reformatted (e.g., encoded, decoded, encrypted, decrypted, compressed, decompressed, and the like) in a manner suitable for transmission to and receipt by the receiver. At step 1160, moderator computing device 1116 may send instructions to receiver 1110 to share the collaboration data with conference device 1112 and cause conference device 1112 to share the collaboration data with the remote server 1124. At step 1164, receiver 1110 may share the collaboration data with conference device 1112 and instruct the conference device 1112 to share the collaboration data with the remote server 1124. The collaboration data sent to the conference device may be reformatted (e.g., encoded, decoded, encrypted, decrypted, compressed, decompressed, and the like) in a manner suitable for transmission to and receipt by the conference device. In one example, receiver 1110 may share the conference data with the conference device 1112 via Ethernet.

At step 1166, conference device 1112 may share collaboration data with conference platform running on remote server 1124. The collaboration data sent to the remote server may be reformatted (e.g., encoded, decoded, encrypted, decrypted, compressed, decompressed, and the like) in a manner suitable for transmission to and receipt by the remote server. It is understood that conference device 1112 may be connected to the Internet via receiver 1110 (e.g., via an Ethernet or Wi-Fi connection), or otherwise may communicate directly with remote server 1124. It is understood that that in another example, a representation of the local data and the collaboration data may be combined and the combined representation may be shared by the conference device 1112 with the remote server 1124.

Figure 12:
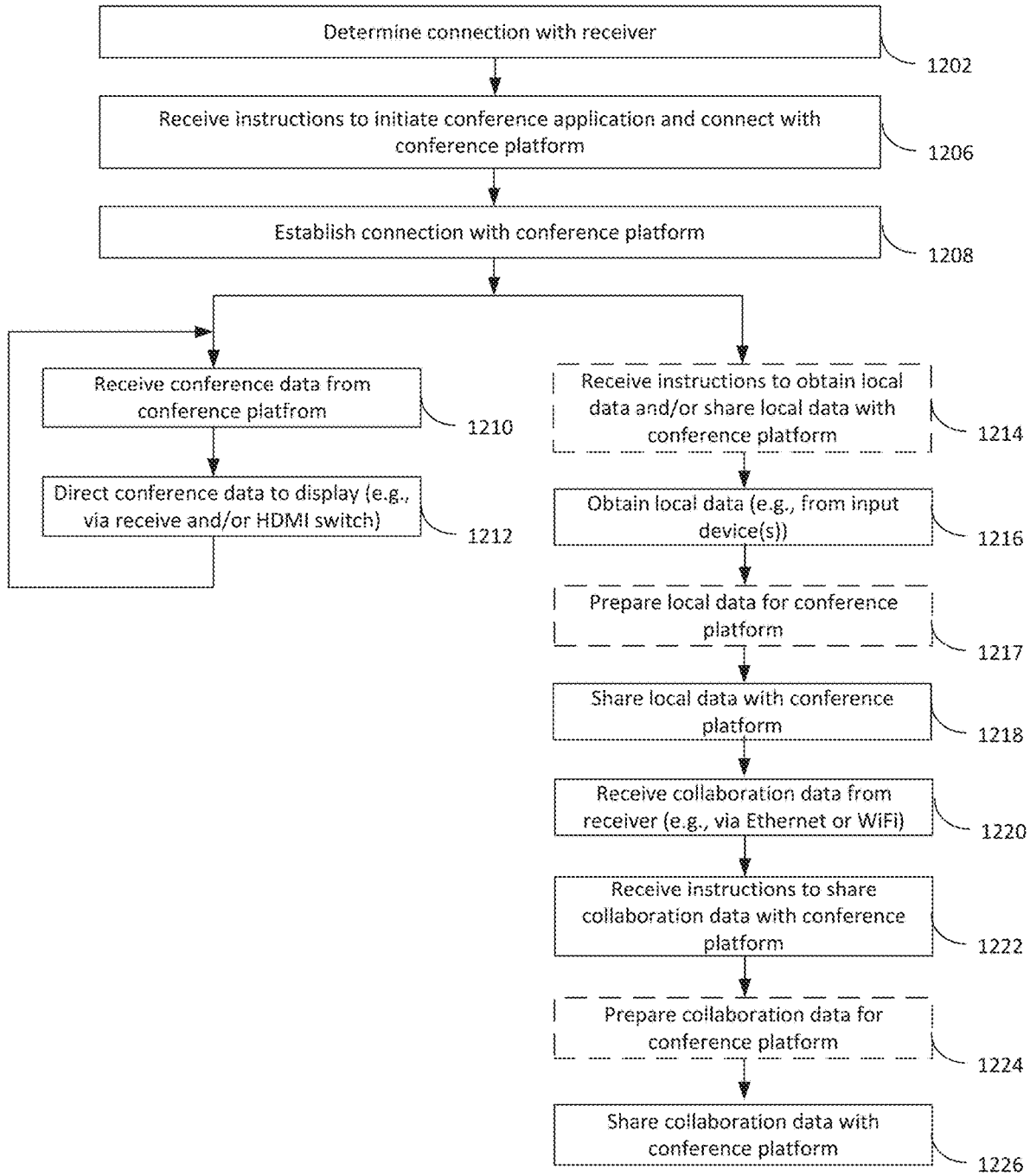
FIG. 12 is a schematic illustration of an example process flow for a conference device in communication with a remote server, receiver, and moderator device, in accordance with the principles of the present invention.

Referring now to FIG. 12, a schematic illustration of an example process flow for sending local and collaboration data to a conference platform via a conference device is illustrated in accordance with the principles of the present invention. For example, the steps illustrated in FIG. 12 may be performed by a conference device such as conference device 1012 of FIG. 10. Some or all of the operations and/or tasks of the process flow may be optional and/or may be performed in a different order.

To initiate the actions of sending collaboration or local audio and/or visual data to a remote server and receiving conference audio and/or visual data from a remote device, at block 1202 computer-executable instructions stored on a memory of a device, such as a conference device, may be executed to determine a connection with a receiver. For example, the connection may be one or more well-known wired or wireless connections such as one or more Ethernet, WiFi, or HDMI.

At step 1206, computer-executable instructions stored on a memory of a device, such as a conference device, may be executed to receive instructions to initiate or otherwise run a conference application on the conference device and to connect with the conference platform. In one example, the receiver may instruct the conference device to connect to the conference platform and may even instruct the conference device which conference session it should join (e.g., with a conference session identification value).

At step 1208, computer-executable instructions stored on a memory of a device, such as a conference device, may be executed to establish a connection with the conference platform running on the remote device. For example, the conference device may run the conference application and may connect to and join a conference session using the conference application. At step 1210, computer-executable instructions stored on a memory of a device, such as a conference device, may be executed to receive conference data from the conference platform. Conference data may be audio and/or visual data generated and/or shared with the conference platform by the remote device also connected to the conference platform. At step 1212, computer-executable instructions stored on a memory of a device, such as a conference device, may be executed to direct conference data to a display. For example, the conference device may direct the conference data to the receiver and/or an HDMI switch in communication with the display via an HDMI connection. Step 1210 may be reinitiated after step 1212.

At optional step 1214, computer-executable instructions stored on a memory of a device, such as a conference device, may be executed to receive and/or determine instructions to obtain or generate local data and/or share local data with the conference platform. For example, instructions to obtain local data and/or share local data with the conference platform may come from the receiver. Alternatively, the conference device may be preprogrammed to obtain local data and/or to share the local data with the conference platform once such local data is obtained or otherwise generated or received.

At step 1216, computer-executable instructions stored on a memory of a device, such as a conference device, may be executed to obtain or otherwise generate local data from one or more input devices. As explained above, the input devices may be one or more devices designed to generate audio and/or visual data and may be standalone devices and/or may be integrated into the conference device. At optional step 1217, computer-executable instructions stored on a memory of a device, such as a conference device, may be executed to prepare local data for the conference platform. For example, such data may need to be encrypted, compressed, conditioned, and/or encoded to be shared with the conference platform and ultimately presented on the remote device via the conference platform.

At step 1218, computer-executable instructions stored on a memory of a device, such as a conference device, may be executed to share or otherwise send local data with the conference platform (e.g., over the Internet). The conference device may connect to the Internet via the receiver (e.g., via an Ethernet or WiFi connection) or alternatively may connect to the Internet directly (e.g., via an access point, router, and/or cellular connection). It is understood that the conference device may be preprogrammed to share the local data with the conference platform upon receiving or generating it, or alternatively, may receive instructions to share the data (e.g., from the moderator computing device or member computing devices).

At step 1220, computer-executable instructions stored on a memory of a device, such as a conference device, may be executed to receive collaboration data from the receiver. At step 1222, computer-executable instructions stored on a memory of a device, such as a conference device, may be executed to receive and/or determine instructions to share collaboration data. For example, the conference device may receive such instructions from the receiver. Alternatively, the conference device may be preprogrammed to share collaboration data with the conference platform upon receiving such collaboration data from the receiver.

At optional step 1224, computer-executable instructions stored on a memory of a device, such as a conference device, may be executed to prepare collaboration data for the conference platform. For example, such data may need to be encrypted, compressed, conditioned, and/or encoded to be shared with the conference platform and ultimately presented on the remote device via the conference platform. At step 1226, computer-executable instructions stored on a memory of a device, such as a conference device, may be executed to send and/or share the collaboration data to or with the conference platform for presentation on the remote device.

It is understood that the conference device may alternatively receive the collaboration data first and send the collaboration data to the conference platform and then subsequently obtain or generate the local data and send the local data to the conference platform. Accordingly, steps 1220-1226 may precede steps 1214-1218. It is further understood that steps 1210-1212, steps 1214-1218 and/or 1220-1226 may occur simultaneously. It is further understood that the collaboration data and the local data may be sent to the conference platform together for simultaneous presentation on the remote device via the conference platform.

It should be understood that any of the operations described herein above may be implemented at least in part as computer-readable instructions stored on a computer-readable memory. Upon execution of the computer-readable instructions by a processor, the computer-readable instructions may cause a node to perform the operations. It will of course be understood that the embodiments described herein are illustrative, and components may be arranged, substituted, combined, and designed in a wide variety of different configurations, all of which are contemplated and fall within the scope of this disclosure.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims.

What is claimed is:

1. A method for video conferencing on a conference device running a first conference application, the method comprising:
    establishing a connection using the first conference application with a conference platform running on a server and in communication with a remote device, the first conference application and the conference platform facilitating communication between the conference device, the server and the remote device running a second conference application;
    receiving conference data comprising first visual data from the server via the first conference application, the conference data generated by the remote device;
    communicating the conference data to a receiver running a first collaboration application;
    determining local input data comprising second visual data generated by a first input device in communication with the conference device;
    sending the local input data to the server via the first conference application for presentation on the remote device;
    receiving collaboration data comprising third visual data from the receiver, the collaboration data generated by a moderator device in communication with a receiver and running a second collaboration application, the first and second collaboration applications facilitating communication between the receiver and the moderator device; and
    sending the collaboration data to the server via the first conference application for presentation on the remote device.

2. The method of claim 1, further comprising:
    receiving instructions to send a combined representation of the collaboration data and local input data to the server, via the conference application.

3. The method of claim 1, wherein receiving collaboration data from the receiver comprises receiving collaboration data via a WiFi, Ethernet, or USB connection between the receiver and the conference device.

4. The method of claim 1, wherein the input device is a camera incorporated into the conference device.

5. The method of claim 1, wherein the conference data further comprises first audio data, the local input data further comprising second audio data, and the collaboration data further comprises third audio data.

6. The method of claim 1, wherein communicating the conference data to a receiver comprises communicating conference data to a display in communication with the receiver via an HDMI switch.

7. The method of claim 6, wherein the HDMI switch is incorporated into the receiver.

8. A computerized-system for video conferencing on a conference device running a first conference application, the computerized-system configured to:
    establish a connection using the first conference application with a conference platform running on a server and in communication with a remote device, the first conference application and the conference platform facilitating communication between the conference device, the server and the remote device running a second conference application;
    receive conference data comprising first visual data from the server via the first conference application, the conference data generated by the remote device;
    communicate the conference data to a receiver running a first collaboration application;
    determine local input data comprising second visual data generated by a first input device in communication with the conference device;
    send the local input data to the server via the first conference application for presentation on the remote device;
    receive collaboration data comprising third visual data from the receiver, the collaboration data generated by a moderator device in communication with a receiver and running a second collaboration application, the first and second collaboration applications facilitating communication between the receiver and the moderator device; and
    send the collaboration data to the server via the first conference application for presentation on the remote device.

9. The computerized-system of claim 8, further comprising:
    receive instructions to send a combined representation of the collaboration data and local input data to the server, via the conference application.

10. The computerized-system of claim 8, wherein receiving collaboration data from the receiver comprises receiving collaboration data via a WiFi, Ethernet, or USB connection between the receiver and the conference device.

11. A method for video conferencing on a moderator device running a first collaboration application and a first conference application simultaneously, the method comprising:
    determining, using the first collaboration application, a first connection with a receiver running a second collaboration application at a first time, the receiver connected to a first member device running a third collaboration application at the first time;
    determining, using the first conference application, a second connection with a server running a conference platform at the first time, the server connected to a remote device running a second conference application at the first time;
    determining, using the first collaboration application, first visual data from the receiver, the first visual data indicative of first display data presented on a first display of the first member device;
    sending, using the first conference application, the first visual data to the server to be displayed on a second display of the remote device using the second conference application; and
    receiving, using the first conference application, second visual data from the server, the second visual data received by the server from the remote device.

12. The method of claim 11, wherein the moderator device and the first member device are situated in a first location, the server is situated in a second location, and the remote device is situated in a third location, and each of the first location, the second location, and the third location are different.

13. The method of claim 11, further comprising:
    determining a third connection with a display device; and
    sending the display device the second visual data to cause the display device to present the second visual data.

14. The method of claim 11, further comprising:
    determining third visual data, the third visual data indicative of third display data presented on a third display of the moderator device; and
    sending, using the first conference application, the third visual data to the server to be simultaneously displayed with the first visual data on the second display of the remote device using the second conference application.

15. The method of claim 11, further comprising:
determining a fourth connection with a first input device; and
determining fourth visual data from a first input device.

16. The method of claim 15, further comprising:
sending, using the first conference application, the fourth visual data to the server to be displayed on the second display of the remote device using the second conference application.

17. The method of claim 16, further comprising:
displaying third visual data on a third display of the moderator device while simultaneously sending the fourth visual data to the server.

18. The method of claim 11, further comprising:
determining first audio data from a first input device; and
sending, using the first conference application, the first audio data to the server to be simultaneously presented with the first visual data on the second display of the remote device using the second conference application.

19. The method of claim 11, further comprising encrypting the first visual data prior to sending the first visual data to the server.

20. The method of claim 11, wherein the receiver is further connected to a second member device running a fourth collaboration application, and further comprising:
determining, using the first collaboration application, fifth visual data from the receiver, the fifth visual data indicative of fourth display data presented on a fourth display of the second member device; and
sending, using the first conference application, the fifth visual data to the server to be displayed on the second display of the remote device using the second conference application.

\* \* \* \* \*